US 8,228,174 B2
Jul. 24, 2012

(12) United States Patent
Nonaka

(10) Patent No.: US 8,228,174 B2
(45) Date of Patent: Jul. 24, 2012

(54) RADIO IC TAG READER, ITS CONTROLLER, AND RADIO IC TAG READING SYSTEM

(75) Inventor: Nobuyuki Nonaka, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 611 days.

(21) Appl. No.: 12/521,125

(22) PCT Filed: Nov. 20, 2007

(86) PCT No.: PCT/JP2007/072473
§ 371 (c)(1),
(2), (4) Date: Jun. 25, 2009

(87) PCT Pub. No.: WO2008/081656
PCT Pub. Date: Jul. 10, 2008

(65) Prior Publication Data
US 2010/0066504 A1 Mar. 18, 2010

(30) Foreign Application Priority Data

Dec. 28, 2006 (JP) .................................. 2006-355618

(51) Int. Cl.
*H04Q 5/22* (2006.01)
*H04B 17/00* (2006.01)
*H04B 1/00* (2006.01)
(52) U.S. Cl. ..... 340/10.3; 455/62; 455/63.3; 455/67.11; 455/69
(58) Field of Classification Search .................. 340/10.3; 455/62, 63.3, 67.11, 69
See application file for complete search history.

(56) References Cited

U.S. PATENT DOCUMENTS 6,501,807 B1 * 12/2002 Chieu et al. .................... 375/329
6,546,252 B1 * 4/2003 Jetzek et al. ................... 455/437

FOREIGN PATENT DOCUMENTS

JP 2006-197231 7/2006
JP 2007-23291 9/2007

OTHER PUBLICATIONS

"Power-Saving Radio System Committee report (proposal)", Information and Communication Council Sub-Committee on Information and Communication Technologies, http://www.soumu.go.jp/s-news/2005/pdf/051005_2_2.pdf, Nov. 8, 2006, pp. 1-71 and cover page.

* cited by examiner

*Primary Examiner* — Daniel Wu
*Assistant Examiner* — John Bamert
(74) *Attorney, Agent, or Firm* — Edwards Wildman Palmer LLP

(57) ABSTRACT

A radio IC tag reader comprises: a first variable frequency oscillation section for generating a signal having a frequency meeting a unit radio channel used for transmission/reception to/from a radio IC tag; transmission and reception sections for executing transmission/reception to/from the radio IC tag by using the signal; a second variable frequency oscillation section for changeably generating a signal of a frequency meeting a unit radio channel for measuring the strength of a received electric wave; a carrier sense executing section for measuring strength of a received electric wave in each of the unit radio channels by using the signal; and a main control section for controlling the first variable frequency oscillation section so as to generate a carrier signal having a frequency meeting the next unit radio channel used by the transmission and reception sections based on a result of measurement by the carrier sense executing section, upon passage of a continuous transmittable time after start of transmission/reception.

12 Claims, 20 Drawing Sheets

Fig.4

| UNIT RADIO CHANNEL | FLAG STORAGE FIELD |
|---|---|
| CH1 | 0 |
| CH2 | 0 |
| CH3 | 0 |
| CH4 | 1 |
| CH5 | 0 |
| CH6 | 0 |
| CH7 | 0 |
| CH8 | 1 |
| CH9 | 0 |

RADIO IC TAG READER, ITS CONTROLLER, AND RADIO IC TAG READING SYSTEM

TECHNICAL FIELD

The present invention relates to a radio IC tag reading device, control device thereof, and a radio IC tag reading system, more specifically, it relates to a radio IC tag reading device (for example, a reader/writer) which has a reading function for reading so called a radio IC tag (it also being called an electronic tag and RFID), its control device (for example, a reader/writer control device), and a radio IC tag reading system.

BACKGROUND ART

In a so-called IC tag reading device, if another reading device is present near the IC tag reading device, since interference may occur between the both reading devices, or between the reading device that should not respond to a radio IC tag normally and the radio IC tag, there is a possibility that the radio IC tag cannot be read normally due to interference between radiated electric waves.

As one of necessary technologies for avoiding such inconvenience, loading a LBT (listen before talk) function on a reading device is essentially required (for example, Non-Patent Document 1). The LBT function is a method in which the reading device radiates an electric wave in a bandwidth (carrier sense bandwidth), after confirming that an electric wave having power being equal to or higher than a predetermined level (carrier sense level) is not radiated therein, for a predetermined time (carrier sense time), so as to avoid interference between reading devices and between radio stations.

Moreover, as another technology, there is transmission time control. In some transmission time control technologies, a continuous transmittable time that is a time allowing a reading device to radiate an electric wave for reading is limited to a predetermined time period, and transmission stop time is provided so that, upon passage of the continuous transmittable time, the unit radio channel can be yielded to another radio station (for example, Non-Patent Document 1).

Non-Patent Document 1: "Information and Communication Council Sub-Committee on Information and Communication Technologies Power-Saving Radio System Committee report (proposal)", (online), (searched on Nov. 8, 2006), Internet <http://www.soumu.go.jp/s-news/2005/pdf/051005_2_2.pdf>

DISCLOSURE OF THE INVENTION

Problem to be Solved by the Invention

It is necessary for a conventional radio IC tag reading device having the above mentioned LBT function and transmission time control, to stop reading of a radio IC tag in the execution time of carrier scan or in the transmission stop time. When it was required for the conventional device to read a large number of radio IC tags within a time as short as possible, the time which could be used for transmission/reception processing for reading was limited by the execution time of the carrier scan or the transmission stop time. As a result, a loss occurred in the number of radio IC tags that can be read per unit time, thereby, it was difficult for the conventional device to improve efficiency of reading.

A purpose of the present invention is to provide a radio IC tag reading technology capable of avoiding decrease of the read number of radio IC tags due to the execution time of the carrier scan or the transmission stop time.

Means for Solving the Problem

The present invention is proposed as a radio IC tag reading device (for example, a reader/writer) which can use a plurality of unit radio channels and reads a radio IC tag.

The radio IC tag reading device includes: a first oscillation means (for example, a first variable frequency oscillation section) for generating a signal having a frequency meeting a unit radio channel to be used for transmission/reception to/from the radio IC tag; a transmission/reception means (for example, a transmission section and a reception section) for executing transmission/reception to/from the radio IC tag, using a signal generated by the first oscillation means; a second oscillation means (for example, second variable frequency oscillation section) for generating a signal having a variable frequency meeting a unit radio channel that measures strength of a received electric wave; a carrier sense means (for example, a carrier sense executing section) for measuring strength of a received electric wave regarding each unit radio channel using the signal generated by the second oscillation means; and a control means (for example, a main control section) for controlling the first oscillation means so as to generate a carrier wave signal having a frequency meeting the next unit radio channel to be used by the transmission/reception means based on a measured result by the carrier sense means, upon passage of a continuous transmittable time that is a time during which the unit radio channel to be used for transmission/reception to the radio IC tag can be used continuously, after start of the transmission/reception by the transmission/reception means.

According to the above radio IC tag reading device, since the career sense means detects an empty state of each unit radio channel, upon arrival of a continuous transmittable time in a certain radio channel, transmission/reception is executed immediately by switching a frequency into that of the radio unit channel that is the empty channel, enabling reading of the radio IC tag with no time loss and improved time efficiency.

The above-mentioned radio IC tag reading device may be further characterized in that, upon passage of the continuous transmittable time that is a time during which one unit radio channel can be used continuously, the control means causes the first oscillation means to change its frequency so as to cause the transmission means to transmit/receive using another unit radio channel without providing a transmission stop time.

According to the above radio IC tag reading device, it is possible to eliminate loss of reading times of radio IC tags due to the transmission stop time.

Moreover, the radio IC tag reading device may further be characterized in that the control means causes the second oscillation means to change a frequency of a generating signal so that the carrier sense means executes carrier sense for each of the plurality unit radio channels.

According to the above radio IC tag reading device, since an empty state of each unit radio channel can be monitored even during transmission/reception processing, it is possible for the radio IC tag reading device to start, continue, and restart transmission/reception immediately by utilizing an empty unit radio channel, enabling to eliminate loss of reading times of radio IC tags due to stopping of transmission/reception.

A second aspect of the present invention is proposed as a control device (for example, a reader/writer control device) for controlling the radio IC tag reading device (for example, a reader/writer) that reads a radio IC tag, and the control device can use a plurality of unit radio channels.

The control device includes: a transmission/reception control means (for example, transmission/reception control section) for directing the radio IC tag reading device to use a unit radio channel to be used for transmission/reception to/from the radio IC tag; and a carrier sense control means (for example, carrier sense section) for receiving information (for example, RSSI) indicating intensity of an received electric wave regarding each unit radio channel, which is measured by the radio IC tag reading device, and for storing information (for example, a carrier sense result table) indicating usability of each unit radio channel based on the information, wherein, upon passage of a continuous transmittable time that is a time during which the same unit radio channel can be used continuously, after start of the transmission/reception by the radio IC tag reading device, the transmission/reception control means, based on the information indicating usability of each unit radio channel, directs the radio IC tag reading device to use a unit radio channel other than the unit radio channel that has been used for the transmission/reception by the radio IC tag reading device.

According to the above control device, since an empty state of each unit radio channel can be known from the information indicating usability of each unit radio channel, upon arrival of a continuous transmittable time in a certain radio unit channel, it is possible to cause the radio IC tag reading device to execute transmission/reception by immediately switching a frequency into a frequency of an empty unit radio channel, enabling to read radio IC tags with no time loss and improved time efficiency.

Moreover, in the control device, upon passage of the continuous transmittable time, the transmission/reception means may cause the radio IC tag reading device to execute transmission/reception using another unit radio channel without providing a transmission stop time.

According to the above control device, it is possible to eliminate loss of reading times of radio IC tags due to the transmission stop time.

Furthermore, in the control device, the carrier sense means may direct the radio IC tag reading device to change a unit radio channel for executing carrier sense so that the radio IC tag reading device executes carrier sense for each of the plurality of unit radio channels.

According to the above control device, since it is possible to monitor the empty state of each unit radio channel even during transmission/reception of the radio IC tag reading device, it is possible to start, continue and restart transmission/reception immediately by utilizing an empty radio channel, enabling to eliminate loss of reading times of radio IC tags due to stopping of the transmission/reception.

A third aspect of the present invention is proposed as a radio IC tag reading system for reading a radio IC tag, which can use a plurality of unit radio channels.

The radio IC tag reading system includes: a radio IC tag reading device for executing transmission/reception to/from a radio IC tag using any one of the plurality of unit radio channels and measuring strength of a received electric wave regarding each unit radio channel to output information indicating measured results; and a control device (for example, a reader/writer control device) for directing the radio IC tag reading device to use a unit radio channel to be used for transmission/reception to/from the radio IC tag, receiving information (for example, RSSI) indicating the strength of a received electric wave that is measured by the radio IC tag reading device, storing information (for example, a carrier sense result table) indicating usability of each of the unit radio channels based on the information indicating the strength of a received electric wave, and directing, upon passage of a continuous transmittable time during which the same unit radio channel can be used continuously, after start of the transmission/reception by the radio IC tag reading device, based on the information indicating usability of each of the unit radio channels, directs the radio IC tag reading device to use a unit radio channel other than the unit radio channel that has been used for transmission/reception by the radio IC tag reading device.

According to the above radio IC tag reading system, since the empty state of each unit radio channel can be known from the information indicating usability of each unit radio channel, upon arrival of a continuous transmittable time in a certain radio unit channel, transmission/reception can be executed immediately by switching a frequency into the frequency of an empty unit radio channel, enabling to read the radio IC tag with no time loss and improved time efficiency.

Moreover, in the above-mentioned radio IC tag reading system, upon passage of the continuous transmittable time, the control device may cause the radio IC tag reading device to execute transmission/reception using another unit radio channel without providing a transmission stop time.

According to the above radio IC tag reading system, it is possible to eliminate loss of reading times of radio IC tags due to the transmission stop time.

Moreover, in the above-mentioned radio IC tag reading system, the control device may direct the radio IC tag reading device to change the unit radio channel to execute carrier sense so that the radio IC tag reading device executes carrier sense for each of the plurality of unit radio channels.

According to the above radio IC tag reading system, since the empty state can be monitored even during transmission/reception processing of the radio IC tag reading device, it is possible to start, continue, and restart transmission/reception immediately by utilizing an empty unit radio channel, enabling to eliminate loss of reading times of radio IC tags due to stopping of transmission/reception.

Effects of the Invention

According to the present invention, it is possible to avoid time loss due to execution time of carrier sense processing and the transmission stop time so as to read radio IC tags more than ever within a limited time.

BRIEF DESCRIPTION OF THE DRAWINGS

FIG. 4 is a block diagram illustrating an example of a carrier sense result table;

DESCRIPTION OF THE REFERENCE SYMBOLS

1 . . . radio IC tag reading system; 10 . . . reader/writer control device; 20 . . . reader/writer; 30 . . . antenna unit; 40 . . . radio IC tag; 501 . . . transmission section; 502 . . . reception section; 503 . . . first variable frequency oscillation section; 504 . . . carrier sense executing section; 505 . . . second variable frequency oscillation section; 506 . . . main control section

BEST MODES FOR CARRYING OUT THE INVENTION

First, an example of a basic configuration of a radio IC tag reading system according to the present embodiment, will be described.

1. Radio IC Tag Reading System

Figure 1:
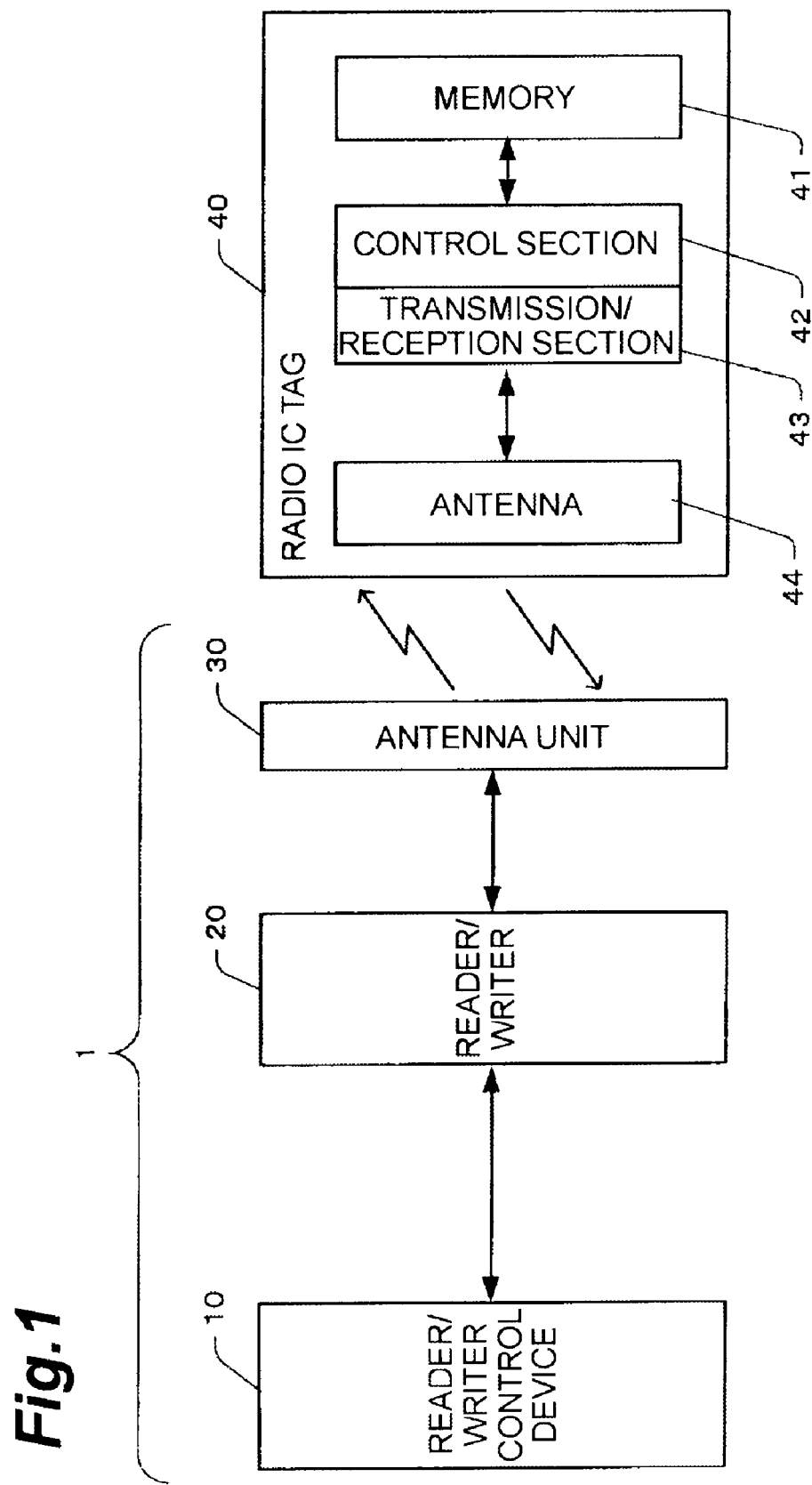
FIG. 1 is a block diagram illustrating an example of the configuration of a radio IC tag reading system.

FIG. 1 is a functional block diagram illustrating an example of the basic configuration of a radio IC tag reading system according to an embodiment of the present invention.

The radio IC tag reading system 1 is constructed by a reader/writer control device 10, a reader/writer 20 connected to the reader/writer control device 10, and an antenna unit 30 connected to the reader/writer 20. Hereinafter, components of the radio IC tag reading system 1 will be described.

1.1. Reader/Writer Control Device

The reader/writer control device 10 executes reading processing of the reader/writer 20, that is processing such as, transmission/reception to/from the radio IC tag 40 accompanied with transmission time control, determination of presence of empty channel based on the result of carrier sense (LBT), and it determines and prescribes a unit radio channel to be used for transmission/reception. That is, the reader/writer control device 10 has a function of ordering the reader/writer 20 to execute reading processing (transmission of a carrier wave etc. for causing the radio IC tag to be in a receiving state, transmission of the carrier wave etc. for continuing to supply an electric power to the radio IC tag, and reception of response from the radio IC tag), and to transmit the data read from the radio IC tag, and functions of storing the data received from the reader/writer 20 and executing a predetermined information processing (for example, generating a list of unique IDs of the radio IC tags), and it specifies the unit radio channel that is used by the reader/writer 20 for transmission/reception, stores the carrier sense execution result, determines a channel to be used, and controls a transmission time based on the carrier sense result. Here, so called "carrier sense" means to detect whether a certain device transmits a signal, and as described later as the description of the present embodiment, it includes to measure strength of a received electric wave of a unit radio channel or the like.

Figure 2:
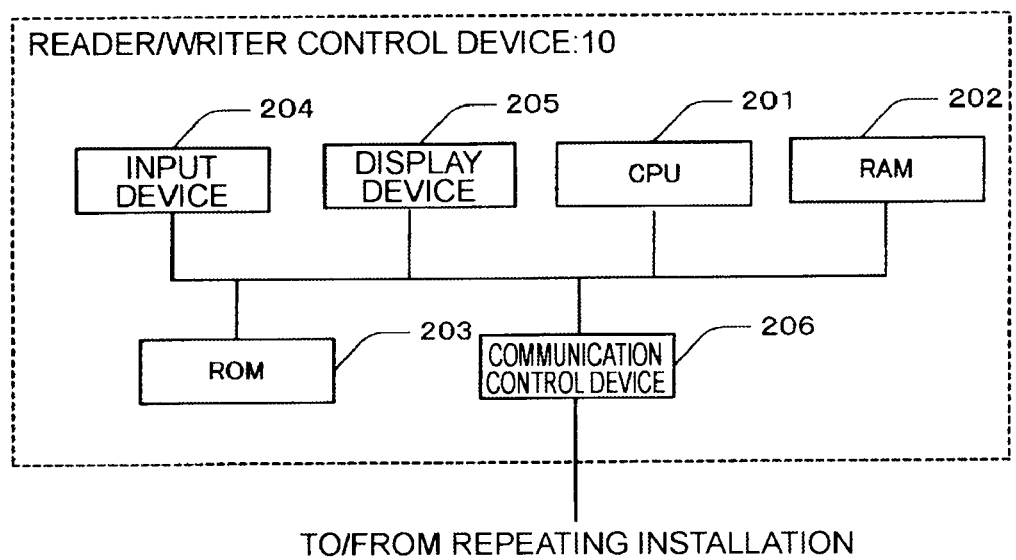
FIG. 2 is a block diagram illustrating an example of the configuration of hardware of a reader/writer control device.

The reader/writer control device 10 is an information processor equipped with a processor such as a CPU, and a storage device such as a ROM and a RAM, for example, it is a computer, various controllers and the like. FIG. 2 is a block diagram illustrating an example of a hardware configuration of the reader/writer control device 10. In the example of the configuration illustrated in FIG. 2, the reader/writer control device 10 includes: a CPU 201; a RAM 202 that is temporal storage means; a ROM 203 that stores a program and fixed data; an input device 204 such as a keyboard and a pointing device that codes user's input to provide it to the CPU 201; an on screen display 205 (for example, a liquid crystal display) for informing the processed result of the CPU 201 to a user; and a communication control device 206 for communicating with a reader/writer 20 (for example, a LAN board etc.).

Figure 3:
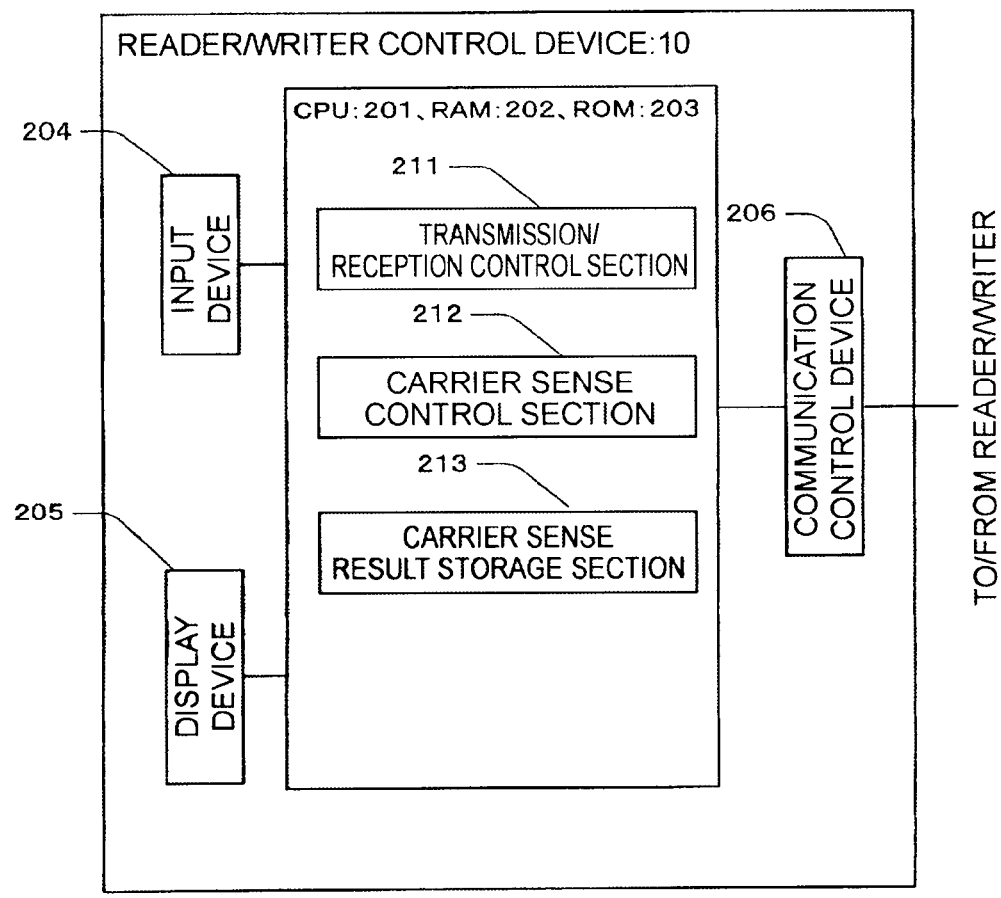
FIG. 3 is a functional block diagram of the reader/writer control device.

FIG. 3 is a functional block diagram of the reader/writer control device 10. The reader/writer control device 10 controls transmission/reception operations of the reader/writer 20, and it includes: a transmission/reception control section 211 for specifying a unit radio channel (that is, a frequency of a carrier wave) used when the reader/writer 20 executes transmission/reception processing to/from the radio IC tag 40; a carrier sense control section 212 for receiving the carrier sense result from the reader/writer 20 to store it and directs the reader/writer 20 to use a unit radio channel (frequency) to be used for a target of carrier sense; and the carrier sense result storage section 213 for storing and cashing the carrier sense result.

FIG. 4 is a view illustrating an example of the memory content of the carrier sense result storage section 213. FIG. 4 illustrates an example of a data configuration of a carrier sense result table 400 that is the memory content of the carrier sense result storage section 213. In this example, the carrier sense result table 400 has one record 401 regarding each unit radio channel assigned as a usable frequency band of the reader/writer 20, and each record 401 has a flag storage field 402. In the flag storage field 402, information indicating whether the unit radio channel is usable, for example, information indicating whether the interference wave power in the unit radio channel is smaller than or equal to a predetermined value, is written. For example, if the measurement result received by the carrier sense control section 212 indicates that the interference wave power of the unit radio channel is smaller than or equal to a value of a predetermined value −74 dBm, the carrier sense control section 212 stores "zero" in the flag storage field 402 of the corresponding record 401. On the other hand, if the measurement result received by the carrier sense control section 212 indicates that the interference wave power of the unit radio channel is larger than a value of a predetermined value −74 dBm, "one" is stored in the flag storage field 402 of the corresponding record 401. The information written in the flag storage field 402 is a result of the latest carrier sense in the unit radio channel, and every time when the carrier sense processing in the unit radio channel is executed, it is updated to newest information.

In addition, the operations of components 211 to 213 of the reader/writer device 10 and the reader/writer device 10 will be described later.

1.2. Reader/Writer

Next, the reader/writer 20 according to the present embodiment will be described.

The reader/writer 20 is a device that transmits/receives from/to a radio IC tag 40 using a radio wave, and reads information stored (for example, unique IDs) by the radio IC tag 40. Moreover, the reader/writer 20 is configured to be able to selectively use a plurality of usable unit radio channels (frequency bands) in transmission/reception to/from the radio IC tag 40. For example, if the reader/writer 20 that reads a so called high output 950 MHz band passive tag is taken for an example, the reader/writer 20 can selectively use nine unit radio channels that are made by dividing the radio frequency band of 952 to 954 MHz allocated for transmission/reception into band widths of 200 KHz.

Moreover, in order to monitor whether a frequency band is used by another radio station such as another reader/writer, the reader/writer 20 continuously executes carrier sense of the plurality of unit radio channel in turn by a predetermined period. In the reader/writer 20 according to the present embodiment, the carrier sense time in each unit radio channel is defined as a time determined by a standard/criteria to which the reader/writer 20 have to follow, for example, a reader/writer for the above-mentioned high output 950 MHz band passive tag, it executes carrier sense for each radio unit channel by 5 ms.

Even if the reader/writer 20 is during a transmission time of an electric wave for reading the radio IC tag 40, and during a stop time after transmission, it continues executing carrier sense processing continuously and cyclically. Of course, even not during the transmission time and the stop time (for example, during a waiting time), it continues executing carrier sense continuously and cyclically.

The reader/writer 20 passes the result of the above-mentioned carrier sense to the reader/writer control device 10. Upon reception of the result of the carrier sense from the reader/writer 20, the reader/writer control device 10 records a carrier sense result table 400 that is data indicating whether each unit radio channel is usable.

When reading the radio IC tag 40, the reader/writer 20 selects any one of unit radio channels depending on the above-mentioned carrier sense result, and executes transmission/reception of command/data to/from the radio IC tag 40 in the unit radio channel.

While executing carrier sense by switching each unit radio channel in turn, the reader/writer 20 executes transmission/reception for reading the radio IC tag 40 in the unit radio channel specified according to a prescription from the reader/writer device 10. The transmission/reception processing can be executed continuously for the continuous transmittable time at most. When it is necessary to execute continuous transmission further after the continuous transmittable time has past, the reader/writer 20, by referring to the latest result of the carrier sense executed continuously until the continuous transmittable time has past, searches an empty unit radio channel, and if an empty unit radio channel is present, it moves to the unit radio channel, and immediately executes transmission continuously in the unit radio channel without waiting passage of the transmission stop time, the carrier sense time and the back off time.

Figure 5:
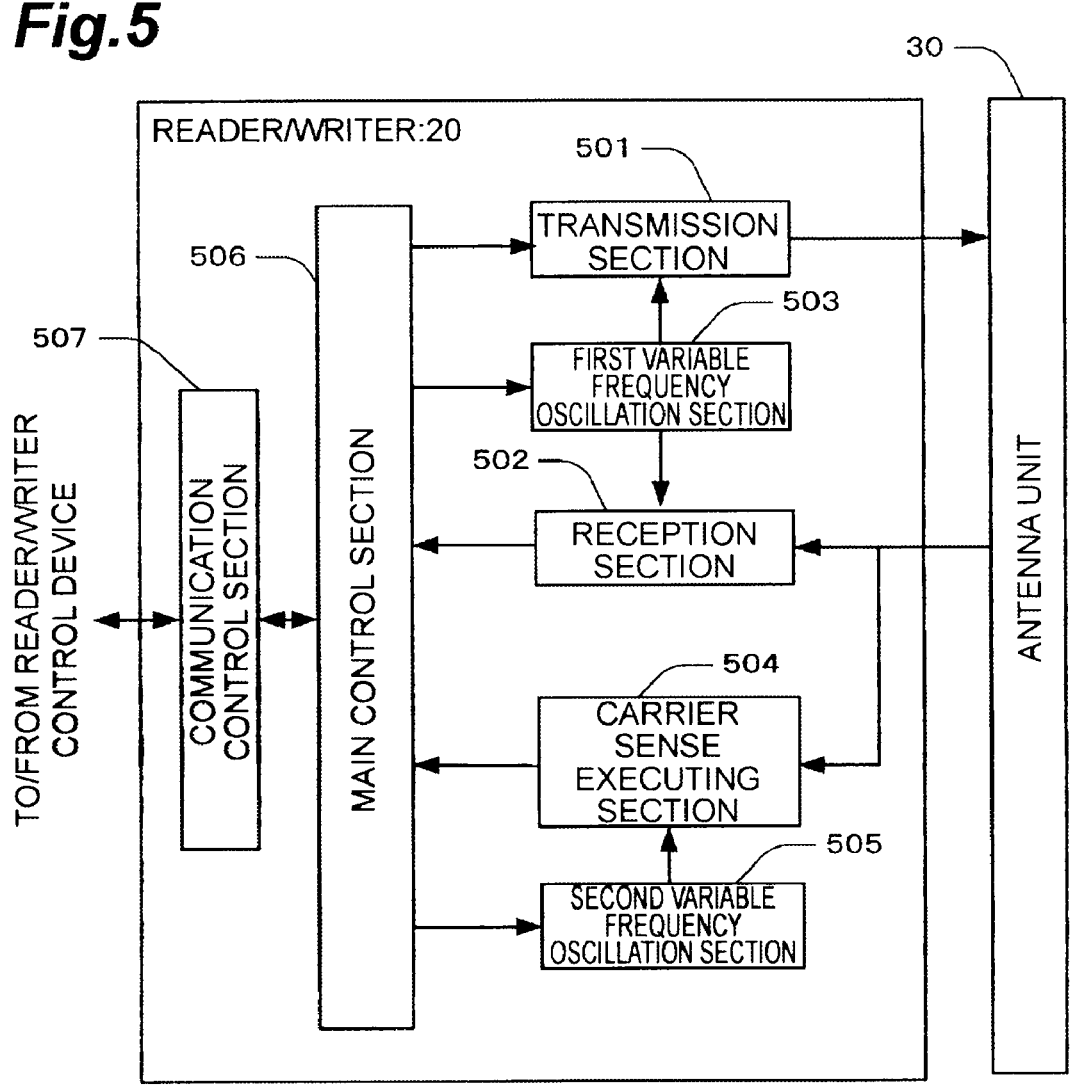
FIG. 5 is a block diagram illustrating an example of the configuration of a reader/writer.

In FIG. 5, a block diagram illustrating an example of the configuration of the reader/writer 20 is illustrated. Hereinafter, with reference to FIG. 5, the example of the configuration of the reader/writer 20 will be described. The reader/writer 20 includes: a transmission section 501; a reception section 502; a first variable frequency oscillation section 503; a carrier sense executing section 504; a second variable frequency oscillation section 505; a main control section 506; and a communication control section 507.

1.2.1. Transmission Section

The transmission section 501 transmits a carrier wave and a modulated wave to the radio IC tag 40 through an antenna unit 30 by a radio wave. FIG. 5 is a block diagram illustrating an example of a circuit configuration of the transmission section 501. Hereinafter, with reference to FIG. 6, an example of the configuration of the transmission section 501, will be described.

Figure 6:
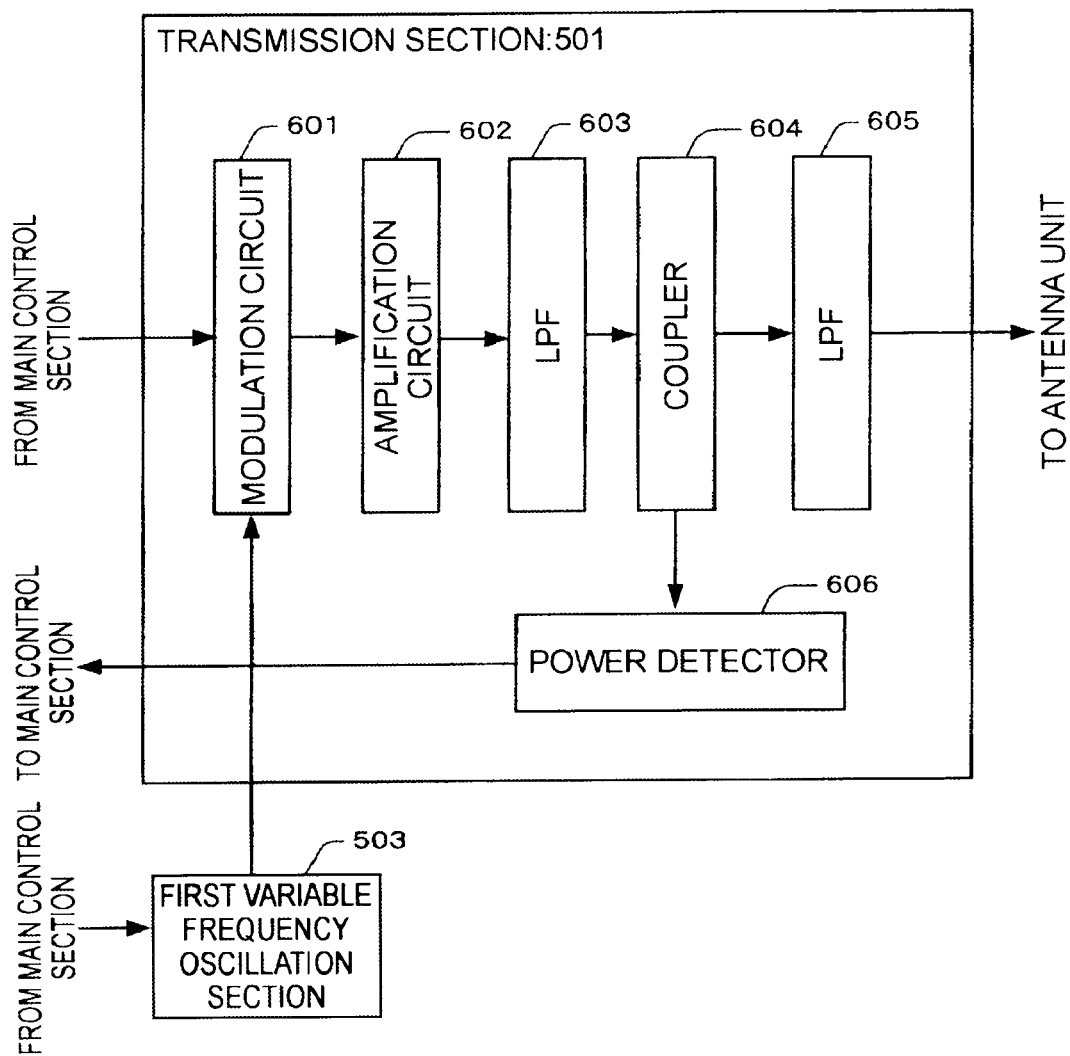
FIG. 6 is a block diagram illustrating an example of a circuit configuration of a transmission section of the reader/writer.

In the example of the configuration illustrated in FIG. 6, the transmission section 501 includes: a modulation circuit 601; an amplification circuit 602 connected to the output side of the modulation circuit 601; a first low pass filter 603 connected to the output side of the amplification circuit 602; a coupler 604 connected to the output side of the first low pass filter 603; a second low pass filter 605 connected to the output side of the coupler 604; and a power detector 606 connected to another output side of the coupler 604.

The modulation circuit 601, using a command etc. output from the main control section 506*a* as a base-band signal, modulates a carrier wave signal output from the first variable frequency oscillation section 503 by means of a predetermined modulation method (for example, a Direct UP Converter method) and outputs the modulated wave. The amplification circuit 602 receives the modulated wave from the modulation circuit 601, and amplifies the modulated wave to a level enabling air radiation. The first and second low pass filters 603 and 605 have a function of removing spurious signals contained in the amplified modulated wave. The coupler 604 receives the amplified modulated wave from the first low pass filter 603, distributes the modulated wave, and outputs them to the power detector 606. The power detector 606 receives the distributed modulated wave, detects a transmitted output, and outputs it to the main control section 506.

Moreover, the output of the above-mentioned first variable frequency oscillation section 503 is connected to the modulation circuit 601, and modulated using a signal output from the first variable frequency oscillation section 503 as a carrier wave.

1.2.2. Reception Section

Figure 7:
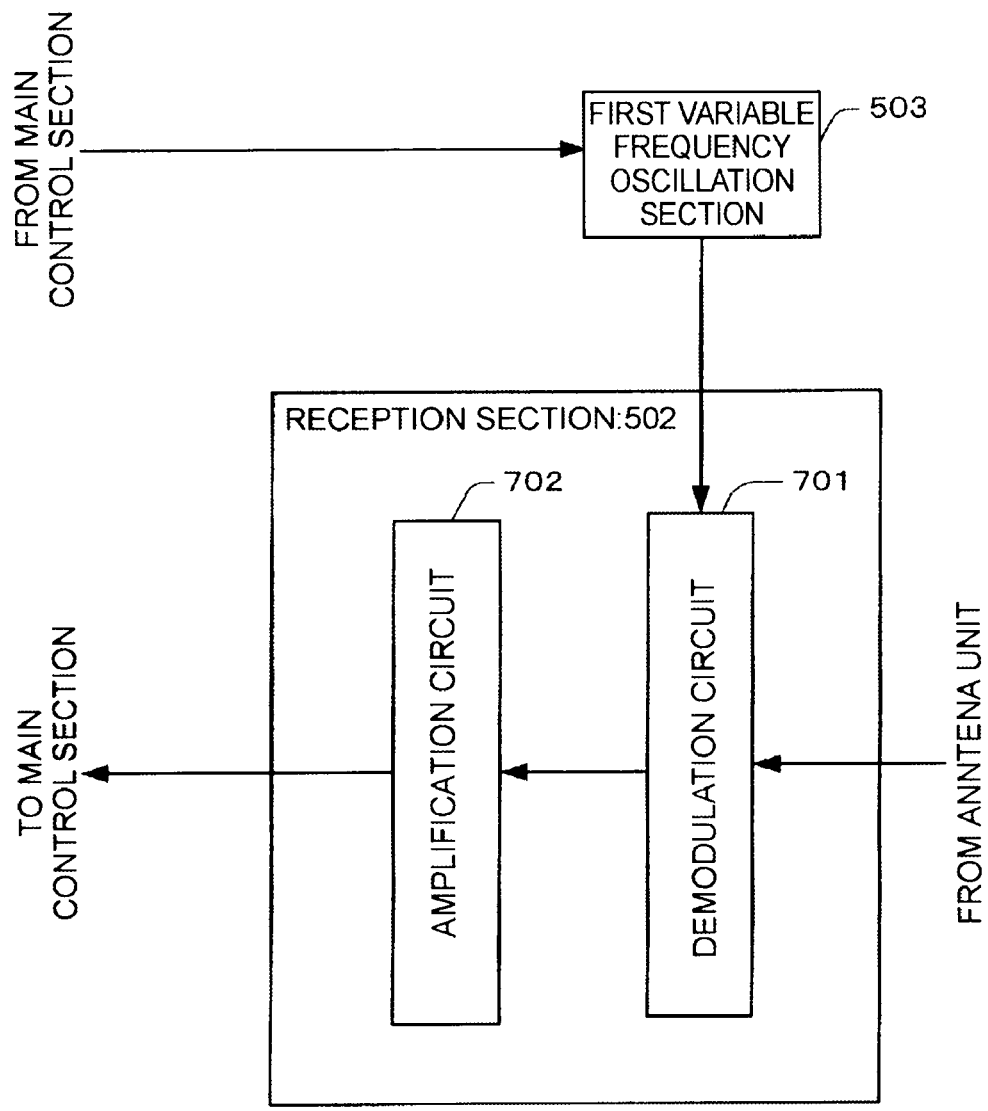
FIG. 7 is a block diagram illustrating an example of a circuit configuration of a reception section of the reader/writer.

Next, the reception section 502 will be described. In FIG. 7, a block diagram illustrating an example of the circuit configuration of the reception section 502 is demonstrated. The reception section 502 illustrated in FIG. 7 includes a demodulator circuit 701 and an amplification circuit 702. To the demodulator circuit 701, an electric wave received by the antenna unit is supplied. Moreover, to the demodulator circuit 701, the output of the first variable frequency oscillation section 503 is connected, and response from the radio IC tag 40 is received using the same unit radio channel as the unit radio channel used by the transmission section. The demodulator circuit 701 is constructed by, for example, a demodulator using a direct conversion method.

The amplification circuit 702 amplifies the output of the demodulator circuit 701 to a level in which an analog signal can be converted into a digital signal. For example, the amplification circuit 702 is constituted by a first differential amplifier, an active filter connected to it, and a second differential amplifier connected to the output of the active filter. The output of the amplification circuit 702 is converted into a digital signal through an AD converter (not illustrated in figures), and passed to the main control section 506.

1.2.3. First Variable Frequency Oscillation Section

The first variable frequency oscillation section 503 generates a carrier wave signal of a frequency corresponding to the unit radio channel specified by the reader/writer control device 10, and supplies it to the transmission section 501 and the reception section 502. The first variable frequency oscillation section 503 is, for example, a module mounting a PLL (Phase Lock Loop) IC and a VCO (Voltage Control Oscillator) IC.

1.2.4. Carrier Sense Executing Section

Figure 8:
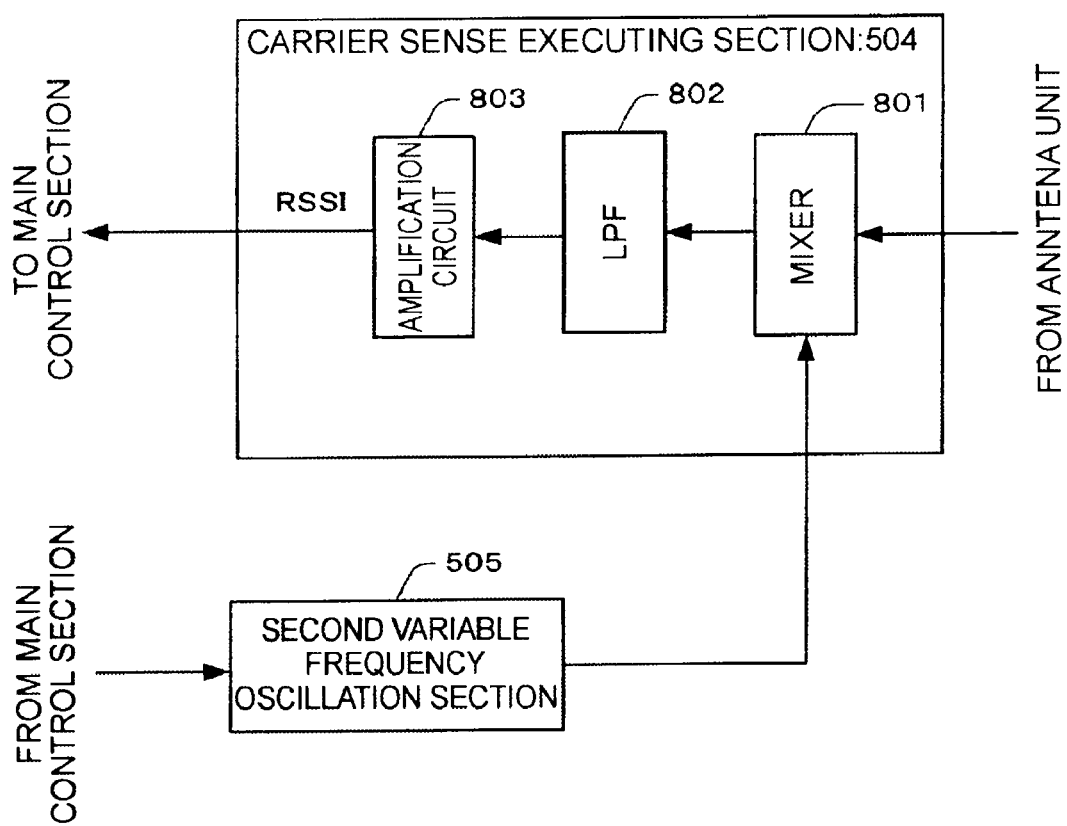
FIG. 8 is a block diagram illustrating an example of a circuit configuration of a carrier sense executing section of the reader/writer.

The carrier sense executing section 504 executes carrier sense of a unit radio channel specified by the reader/writer control device 10, and measures the signal strength of a received electric wave (an interference electric wave) in the specified unit radio channel to output it. In FIG. 8, an example of a circuit configuration of the carrier sense executing section 504 is illustrated. In the example of the configuration illustrated in FIG. 8, the carrier sense executing section 504 is constructed by a mixer 801 that mixes a reception signal received by the antenna unit 30 and a reference signal (having a central frequency of a specified unit radio channel) output from the second variable frequency oscillation section 505 to output an IF signal, a low pass filter 802 that removes the reference signal (a PLL_LO signal) and noises from the output of the mixer 801, and an amplification circuit (for example, a log amplifier) that amplifies the output of the low pass filter 802 to a level in which it can be converted in a DC level. The output of the amplification circuit 803 is passed to the main control section 506 as an RSSI (Received Signal Strength Indicator).

1.2.5. Second Variable Frequency Oscillation Section

A second variable frequency oscillation section 505 generates a reference signal (a PLL_LO signal) at a frequency corresponding to a unit radio channel specified by the reader/writer control device 10, and supplies it to the carrier sense executing section 504. The second variable frequency oscillation section 505 is, for example, a module mounting a PLL (Phase Lock Loop) IC and a VCO (Voltage Control Oscillator) IC.

1.2.6. Central Control Section

The main control section 506 receives a control command from the reader/writer control device 10, interprets it to cause the transmission section to transmit a non-modulated carrier wave and a modulated wave carrying a command, and converts the output of the reception section 502 that received a response signal from an radio IC tag 40 responding to the transmitted modulated wave into data (a unique ID) to pass it to the reader/writer control device 10. Moreover, the main control section 506 directs the first and second variable frequency oscillation sections 503 and 505 to use separate frequencies. Moreover, the main control section 506 receives an RSSI output from the carrier sense executing section 504, and passes it to the reader/writer control device 10 so as to store it as the result of the above-mentioned carrier sense execution.

1.2.7. Communication Control Section

The communication control section 507 is a device communicating with the reader/writer control device 10, such as, for example, a LAN board.

1.3. Antenna Unit

Now, back to FIG. 1, description of components of the radio IC tag reading system 1 according to the present embodiment will be continued.

The antenna unit 30 radiates a carrier wave or a modulated wave received from the reader/writer 20, more specifically, from the transmission section 501, towards the radio IC tag 40, receives an response radiated from the radio IC tag 40, and supplies the response to the reader/writer 20, more specifically, to the reception section 502. Moreover, the antenna unit 30 supplies received signals (including an interference electric wave) to the reader/writer 20, more specifically, to the carrier sense executing section 504.

In an example, the antenna unit 30 is constructed by a transmitting antenna, a receiving antenna (for example, a pole antenna, a patch antenna, or the like) and a case (for example, a resin molded case) for housing and protecting them. In the present embodiment, the antenna unit 30 is a device separated from the reader/writer 20, and connected to it by a LAN cable etc. Accordingly, the antenna unit 30 is configured to be placed even to a place apart from the reader/writer 20.

Moreover, the transmitting antenna and the receiving antenna provided to the antenna unit 30 may be separated (the transmitting antenna and the receiving antenna are provided separately), or may be integrated (one antenna is used for transmission and reception).

Moreover, as another example of configurations adoptable by the present invention, a configuration where entire multiple antenna units 30 or the transmission antenna/reception antenna is incorporated in the reader/writer 20 may be used by the present embodiment.

Moreover, the number of the antenna units 30 connected to the reader/writer 20 is not restricted to one. A configuration in which a plurality of antenna units 30 are connected to one reader/writer 20, which executes transmission/reception processing and carrier sense execution processing, while switching the plurality of the antenna units 30, may be used. In an example, an antenna/unit 30 is provided to each of four corners in a closed space like a certain warehouse, and the four antenna units 30 are connected to one reader/writer 20 through a cable etc., respectively. The reader/writer 20 may connect to each of the four antenna units 30 while switching them by switching means, such as a switch, so as to execute transmission and reception processing and/or carrier sense processing from four different directions and positions.

1.4. Radio IC tag

Next, an example of a general configuration of the radio IC tag 40 will be described.

The radio IC tag 4 includes a memory 41, a control section 42, a transmission/reception section 43, and an antenna 44. The memory 41 is a storage device that stores information used as a reading target, that is, for example, identification codes, such as merchandise information and sender information. The control section 42 interprets a command, a request, an instruction, etc. from the reader/writer 20, and executes motion in response to each of them. The transmission section 43 includes a modulation section (not shown) and a demodulation section (not shown), and it executes modulation/demodulation of a signal in order to communicate with the reader/writer 20. The antenna 44 receives a carrier wave from the reader/writer 20 to feed it to the transmission/reception section 43, and receives a modulated signal from the transmission/reception section 43 to radiate it in the air so that the reader/writer 20 will receive it.

By the above-mentioned description, description of the example of a configuration of the radio IC tag reading system 1 will be finished.

2. Example of Motion of Radio IC Tag Reading System

Next, an example of a motion of the radio IC tag reading system 1 will be described.

2.1. Transmission/Reception (Reading) Processing

In demanding the reader/writer 20 to read the radio IC tag 40, the reader/writer control device 10, selects a unit radio channel that is not used by another radio station (including a reader/writer) with reference to a carrier sense result table 400 that is the result of a latest carrier sense execution and sends a prescription to the reader/writer 20 to read the radio IC tag 40 using a unit radio channel not used by another radio station (including another reader/writer). According to the prescription, the reader/writer 20 reads the radio IC tag 40 using the specified unit radio channel. This is executed within a predetermined continuous transmittable time (for example, within four seconds). If reading of the radio IC tag 40 is not completed within the predetermined continuous transmittable time, the reader/writer 20 will complete transmission/reception at the unit radio channel, and it will inquire the reader/writer control device 10 whether a usable unit radio cannel is present, or wait a prescription from the reader/writer control device 10.

The reader/writer control device 10, referring to the carrier sense execution result stored by a carrier sense result storage section 213, determines whether usable channels (empty channels) are present among the other unit radio channels except for the unit radio channel that has been used by the reader/writer 20. As the result of the determination, if a usable unit radio channel (that is an empty channel) is present, the reader/writer control device 10 prescribes the reader/writer 20 to continue transmission/reception using the empty unit radio channel.

In addition, the radio IC tag reading system 1 according to the present invention, executes changing of the unit radio channel that has been used, due to arrival of a continuous transmittable time, at a time interval as short as possible. For example, after the reader/writer 20 has started to read the radio IC tag using a certain unit radio channel, upon passage of the continuous transmittable time, the reader/writer 20 immediately acts to restart to read the radio IC tag using another empty unit radio channel, without waiting passage of the transmission stop time, the carrier sense time and the back off time.

In a conventional reader/writer, upon arrival of a continuous transmittable time, the reader/writer stops to execute transmission/reception, that is, it stops to reading motion of the radio IC tag 40, for a period including a predetermined stop time (for example, 50 ms), a carrier sense time (for example, 5 ms) for determining whether the unit radio channel is usable, and a back off time (for example, 0 to 5 ms) that is a time for avoiding communication collision after the carrier sense time has past and determined randomly after the carrier sense time has past. As a result, during the period including the predetermined stop time, the carrier sense time and a back off time, reading of the radio IC tag 40 can not be executed, resulting in decrease of the efficiency of reading the radio IC tag 40 (the number of the radio IC tags read per unit time). However, the radio IC tag reading system 1 according to the present invention has not such a time loss, it can continue reading of the radio IC tag 40 without intervening a time loss.

Figure 9:
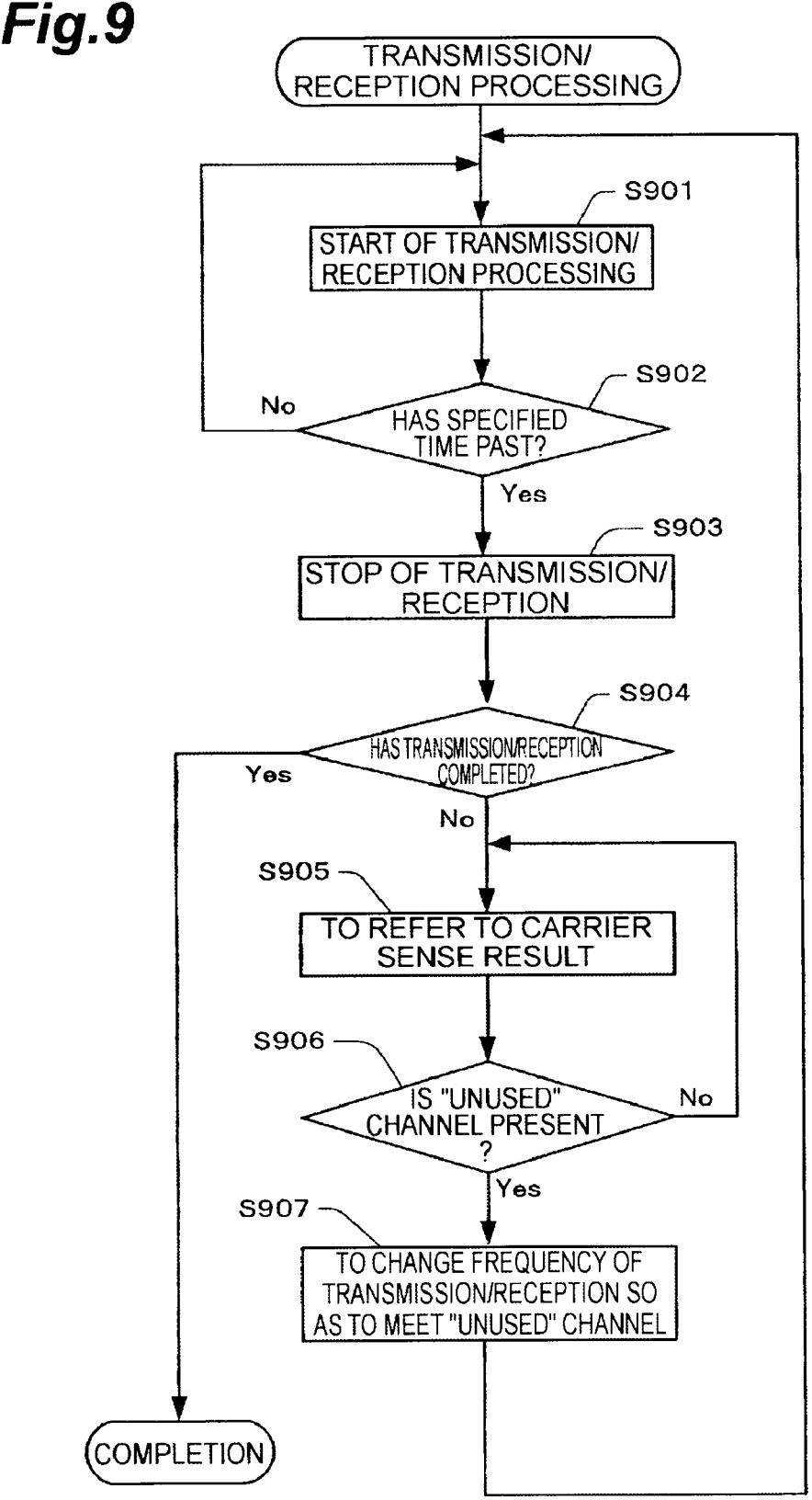
FIG. 9 is a flow chart illustrating an example of transmission/reception processing executed by the radio IC tag reading system.

FIG. 9 is a flow chart illustrating an example of transmission/reception (reading) processing of the radio IC tag reading system 1 according to the present embodiment.

First, in the radio IC tag reading system 1, when reading the radio IC tag 40, the reader/writer control device 10 orders the reader/writer 20 to start transmission/reception (reading) processing. At this time, the reader/writer control device 10 specifies a unit radio channel to be used for transmission/reception. The specification of the unit radio channel is selected and determined by the reader/writer control device 10, based on the carrier sense execution result (specifically, the carrier sense result table 400) obtained as a result of the carrier sense processing mentioned later.

After received the transmission/reception starting order, the reader/writer 20 starts to execute transmission/reception processing using a specified unit radio channel (S901). That is, the reader/writer 20 generates a reference wave having a frequency meeting the center frequency of a specified unit radio channel by the first variable frequency oscillation section 503, and supplies it to the transmission section 501. In the transmission section 501, a carrier wave having the frequency band and a modulated wave that is made by modulating the carrier wave are generated using a reference wave, and the carrier wave and the modulated wave are supplied to the antenna unit 30. Moreover, the response from the radio IC tag 40 by the reception section 502 is also demodulated by the reception section 502, based on the reference wave, and the data obtained as the result of the demodulation is passed to the reader/writer control device 10.

Next, the radio IC tag reading system 1 determines whether the continuous transmittable time has past since the transmission/reception processing has started (S902). The determination may be executed by the reader/writer control device 10, or by the main control section 506 of the reader/writer 20.

As the result of the determination whether the continuous transmittable time has past, if the radio IC tag reading system 1 determines that the continuous transmittable time has not past (S902, No), it returns to Step S901, and continues the transmission/reception processing. On the other hand, when the radio IC tag reading system 1 determines that the continuous transmittable time has past (S902, Yes), the reader/writer 20 will stop the transmission/reception processing (S903). After the transmission/reception processing is stopped, the radio IC tag reading system 1 determines whether the transmission/reception processing has completed, that is, whether the reader/writer 20 has completed reading the readable radio IC tags in a communicatable region thereof (S904).

If the radio IC tag reading system 1 determines that the reader/writer 20 has completed reading (S904, Yes), it completes the transmission/reception processing. On the other hand, if the radio IC tag reading system 1 determines that the reader/writer 20 has not completed reading, that is, there are radio IC tags 40 that are not read (S904, No), it refers to a carrier sense result table 400 stored on a carrier sense result storage section 213 of the reader/writer control device 10 (S905).

Next, the radio IC tag reading system 1 determines whether a unused unit radio channel is present, based on the contents of the carrier sense result table 400 (S906). As a result, if the radio IC tag reading system 1 determines that the unused unit radio channel is not present, it returns to Step S905 and waits for an unused unit radio channel to be stored on the carrier sense result table. On the other hand, if the radio IC tag reading system 1 determines that an unused unit radio channel is present, it prescribes the reader/writer 20 to continue the transmission/reception processing using the unused unit radio channel (S907).

After that, the radio IC tag reading system 1 returns to Step S901, and, using the specified unused unit radio channel, it continues the transmission/reception processing.

Even the continuous transmittable time has past, the above-mentioned transmission/reception processing enables the radio IC tag reading system 1 according to the present invention to continue transmission/reception processing immediately, without waiting passage of the transmission stop time, the carrier sense time and the back-off time.

2.2. Carrier Sense Processing

Next, carrier sense processing according to the present embodiment will be described. The radio IC tag reading system 1 adopts a method for executing carrier sense in a unit radio channel continuously and periodically.

Figure 10:
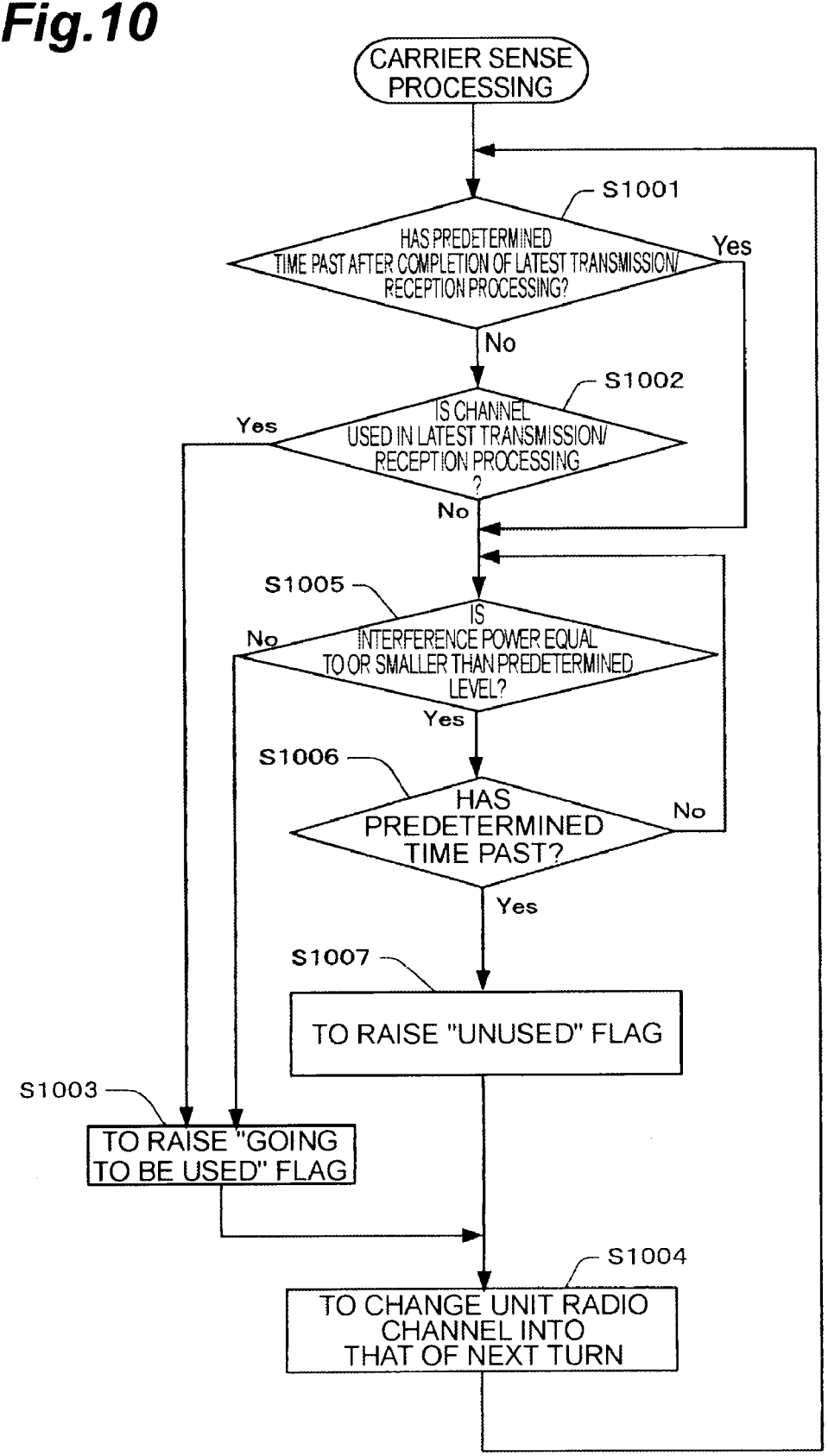
FIG. 10 is a flow chart illustrating an example of carrier sense processing executed by the radio IC tag reading system.

FIG. 10 is a flow chart illustrating an example of carrier sense execution processing executed by the radio IC tag reading system 1 according to the present embodiment. Hereinafter, with reference to FIG. 10, the carrier sense processing executed by the radio IC tag reading system 1 will be described.

First, the radio IC tag reading system 1, more specifically, the carrier sense control section 212 of the reader/writer control device 10, after completion of latest executed transmission/reception processing, determines whether a predetermined time (for example, 50 ms) corresponding to the transmission stop time has past (S1001). If the radio IC tag reading system 1, more specifically, the carrier sense control section 212 of the reader/writer control device 10 determines that the predetermined time has past (S1001, Yes), it advances to Step S1005. On the other hand, if the radio IC tag reading system 1, more specifically, the carrier sense control section 212 of the reader/writer control device 10 determines that the predetermined time has not past (S1001, No), it determines whether the unit radio channel to be a target of carrier sense is the unit radio channel used in the latest executed transmission/reception processing (S1002). If the radio IC tag reading system 1, more specifically, the carrier sense control section 212 of the reader/writer control device 10 determines that the unit radio channel to be a target of carrier sense processing is not the unit radio channel used in the latest executed transmission/reception processing (S1002, No), it advances to Step S1005 described below.

On the other hand, if the radio IC tag reading system 1, more specifically, the carrier sense control section 212 of the reader/writer control device 10 determines that the unit radio channel to be used for executing carrier sense from now is the unit radio channel used in the latest executed transmission/reception processing (S1002, Yes), it raises a flag indicating that the unit radio channel is "going to be used" or "unusable" (S1003). More specifically, in a record 401 corresponding to the unit radio channel of the carrier sense result table 400 stored on the carrier sense result storage section 213, the carrier sense control section 212 writes on a flag storage field 402 information (flag) indicating that the unit radio channel is "going to be used" or "unusable".

Next, in order to execute carrier sense in a next order unit radio channel, the carrier sense control section 212 causes the reader/writer 20 to change a target unit radio channel for executing carrier sense into the next turn unit radio channel (S1004). Here, "the next turn unit radio channel" is referred to as a unit radio channel that is defined as the next turn in predetermined order of carrier sense processing of the unit radio channels. For example, if suppose that the order of carrier sense execution is defined in the increasing order of the numbers of channels 1 to 9, the unit radio channel of the next turn of channel 1 will be channel 2, the unit radio channel of the next turn of channel 2 will be channel 3, and the subsequent turns of the unit radio channels will be defined similarly. In addition, the present invention is not limited to the way for defining the next unit radio channel according to a predetermined order of the carrier sense execution of unit radio channels. If there is a method by which carrier sense can be executed averagely among unit radio channels, even if the target unit radio channel is determined by such a method, the present invention can also be embodied. For example, a method in which the next unit radio channel is determined using random numbers each having an equal appearance probability, may be used, of course.

Upon being announced the unit radio channel determined at Step S1004, the reader/writer 20 returns to Step S1001 again, and executes determination at Step S1001.

Now, if, the radio IC tag reading system 1, more specifically the carrier sense control section 212 determines that a predetermined time has not past (S1001, No) at Step S1001, or determines that the target unit radio channel is not the unit radio channel used in latest transmission/reception processing (S1002, No) at Step S1002, it determines whether (intensity of a received electric wave)/(power of an interference wave) is smaller than a predetermined level in the unit radio channel (S1005). More specifically, the carrier sense control section 212 of the reader/writer control device 10 prescribes a unit radio channel to be used for executing carrier sense to the reader/writer 20, and the main control section 506 of the prescribed reader/writer 20 orders the second variable frequency oscillation section 505 to generate a reference wave having a frequency meeting the specified unit radio channel. The second variable frequency oscillation section 505, in response to the order, generates the reference wave having a frequency meeting the specified unit radio channel to output it to the carrier sense executing section 504. Using the reference wave, the carrier sense executing section 504 generates RSSI meeting (intensity of a received electric wave)/(power of an interference wave) in the specified unit radio channel and returns it to the main control section 506. The main control section 506 passes the RSSI to the reader/writer control device 10, more specifically, the carrier sense control section 212, which, based on the RSSI, determines whether (intensity of a received electric wave/(power of an interference wave) is a predetermined level in the unit radio channel.

If, the radio IC tag reading system 1, more specifically the carrier sense control section 212 determines that the power of an interference wave is more than the predetermined level (S1005, No) at Step S1005, raises a flag indicating that the unit radio channel is "going to be used" or "unusable" (S1003). More specifically, the carrier sense control section 212 writes information (a flag) indicating that the unit radio channel is "going to be used" or "unusable" on a flag storage field 402 in a record 401 corresponding to the unit radio channel of a carrier sense result table 400 stored in a carrier sense result storage section 213.

Next, the carrier sense control section 212, in order to execute carrier sense in a next turn unit radio channel, informs the next turn unit radio channel to the reader/writer 20 (S1004). Upon reception of the information of the next turn unit radio channel, the reader/writer 20 executes Step S1001 again and determines whether a predetermined time has past after the completion of the latest transmission/reception processing (S1001).

On the other hand, if the radio IC tag reading system 1, more specifically the carrier sense control section 212 determines that (intensity of a received electric wave)/(power of an interference wave) is smaller than a predetermined level (S1005, Yes), it determines whether a carrier sense time (for example, five ms) has past after the carrier sense execution is started (S1006). If the radio IC tag reading system 1, more specifically the carrier sense control section 212 determines that the carrier sense time (for example, five ms) has not past (S1006, No), it returns to Step S1005 and again determines whether the power of an interference wave in the unit radio channel is smaller than a predetermined level (S1005). On the other hand, if the radio IC tag reading system 1, more specifically the carrier sense control section 212 determines that the carrier sense time (for example, five ms) has past (S1006, Yes), it raises a flag indicating that the unit radio channel is "not used" or "usable" (S1007). More specifically, the carrier sense control section 212 writes information (a flag) indicating that the unit radio channel is "not used" or "usable" on the flag storage field 402 in the record 401 corresponding to the unit radio channel of the carrier sense result table 400 stored in the carrier sense result storage section 213.

After that, the radio IC tag reading system 1, more specifically the carrier sense control section 212 advances to the above-described Step S1004 and advances to a next unit radio channel.

According to such carrier sense processing, it is possible for each of unit radio channels to be monitored continuously whether it is used, thereby enabling to know an immediately usable non-used (empty) channel. Since the result of the carrier sense will be stored on the carrier sense result storage section 213, referring to the storage contents of the carrier sense result storage section 213, the carrier sense control section 212 will be able to direct the reader/writer 20 to use a unit radio channel that can start immediately or continue transmission/reception, without stopping transmission/reception due to the transmission stop time, the carrier sense time, and the back-off time.

2.3. Specific Example of Motion

Figure 11:
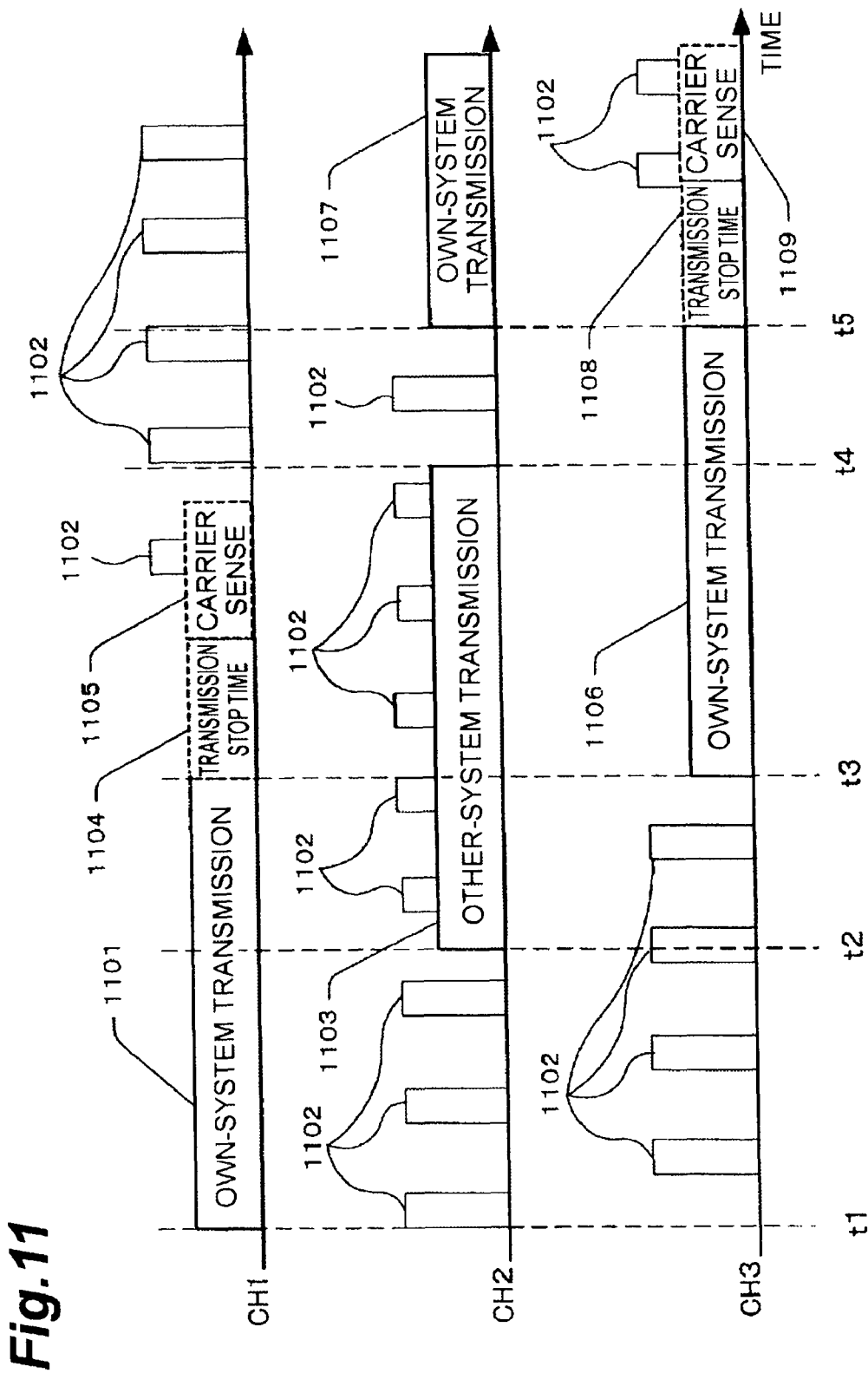
FIG. 11 is a timing chart illustrating an example of the operation of the radio IC tag reading system.

Finally, a specific example of the motion of the radio IC reading system 1 will be described. FIG. 11 is a timing chart illustrating the specific example of the motion of the radio IC reading system 1. In addition, in the example illustrated in FIG. 11, for sake of simplicity, the number of channels allocated to the radio IC reading system 1 will be set to three, and channel 1 (CH1), channel 2 (CH2) and channel 3 (CH3) will be used.

In the example illustrated in FIG. 11, at a time t1, the radio IC tag reading system 1 starts transmission/reception processing (own-system transmission 1101) using channel 1. In parallel with this processing, the radio IC tag reading system 1 executes carrier sense processing 1102 in channels 2 and 3. The carrier sense processing 1102 in channels 2 and 3 is executed continuously and cyclically, for example, first, carrier sense processing is executed in channel 2, next, carrier sense processing is executed in channel 3, then again, carrier sense processing is executed in channel 2, followed by alternative carrier sense processing in channels 2 and 3.

Now, at a time t2, it should be supposed that another radio station has started transmission 1103 using channel 2. By the continuously executing carrier sense processing 1102 in channel 2, the system 1 detects that channel 2 has been "going to be used" and raises a flag indicating that the channel is "going to be used", on the record 401 of channel 2 in the carrier sense result table 400.

Next, upon arrival of time t3, it should be supposed that the continuous transmittable time of the radio IC tag reading system 1 has past in channel 1. Since the transmission 1103 of another radio station in channel 2 is continuing at time t3, while a flag indicating that the channel is "going to be used" is raised on the record 401 of channel 2 of the carrier sense result table 400, a flag indicating that the channel is "not used" is raised on the record 401 of channel 3. The radio IC tag reading system 1, referring to the carrier sense result table at time t3, determines that channel 3 can be used, and after completion of transmission in channel 1, it starts transmission/reception processing 1106 continuously using channel 3.

In FIG. 11, regions of the transmission stop time 1104 and the carrier sense time 1105 that will occur after time t3 for a conventional radio IC tag reading system are represented. Although, the conventional radio IC tag reading system has to wait restarting of transmission/reception until the regions of transmission stop time 1104 and carrier sense time 1105 finishes, the system 1 can restart transmission/reception immediately from time 3 (refer to own-system transmission 1106). In addition, in channel 1, after a time corresponding to transmission stop time 1104 has past, continuous and cyclic carrier sense processing will be executed. In channel 2, execution of continuous and cyclic carrier sense processing 1102 is continued. In channel 3, since transmission/reception processing by the self-system is started, the execution of continuous and cyclic carrier sense processing 1102 will be stopped.

Next, upon arrival of time t4, transmission 1103 of another system in channel 2 will be finished. A flag indicating that a unit radio channel is "not used" is raised on a record of channel 1 of the carrier sense result table 400 after arrival of time t4. Moreover, on a record of channel 2, a flag indicating that a unit radio channel is "not used" is raised, because transmission of another radio station in channel 1 is finished (refer to other-system transmission 1103).

Next, upon arrival of time t5, the continuous transmittable time in channel 3 will be past, thereby, the radio IC tag reading system 1 have to stop transmission/reception (refer to own-system transmission 1106). Since, channels 1 and 2 are not used by the system 1 and other radio stations at time t5, a flag indicating "not used" is raised on each record 401 of channels 1 and 2 of the carrier sense result table 400. The radio IC tag reading system 1, referring to such a carrier sense result table 400 after time t5, determines that channel 1 or 2 can be used. Although any one of channels 1 and 2 can be selected, here, using channel 2, transmission/reception will be started continuously (refer to other-system transmission 1107).

In FIG. 11, regions of the transmission stop time 1108 and the carrier sense time 1109 of channel 3 that will be set in a conventional system, are represented. Although, the conventional system has to wait restarting of transmission/reception until the regions of the transmission stop time 1108 and the carrier sense time 1109 has finished, the system 1 can restart transmission/reception immediately from time 5 (refer to other-system transmission 1107). In addition, since transmission/reception processing by its own system 1 is started in channel 2, execution of continuous and cyclic carrier sense processing 1102 is stopped. In addition, in channel 1, after arrival of time 5, execution of continuous and cyclic carrier sense processing 1102 is continued. In channel 3, after a time corresponding to the transmission stop time 1108 has past, continuous and cyclic carrier sense processing 1102 will be executed.

As mentioned-above, according to the system 1, since reading processing of a radio IC tag can be executed without occurrence of stop period of transmission/reception processing due to the transmission stop time, the carrier sense time, and the back-off time, it is possible to improve efficiency of reading radio IC tags per unit time.

3. Embodiments

Hereinafter, an embodiment of the present invention will be described.

Since, in the embodiment, basic system configuration is not different from that described in the embodiment, description of the configuration of the radio IC tag reading system 1, and reader/writer 20 and the radio IC tag 40 that are components of the system 1, will be omitted.

The reader/writer 20 executes carrier sense processing of unit radio channels for which it uses, once within a predetermined time (hereinafter, referred to as a carrier sense period) and operates so as to execute the carrier sense period repeatedly. In addition, although, in the present embodiment, so called high output radio IC tag reading system will be described, it is also possible for a low output radio IC tag reading system to embody the present embodiment.

Figure 12:
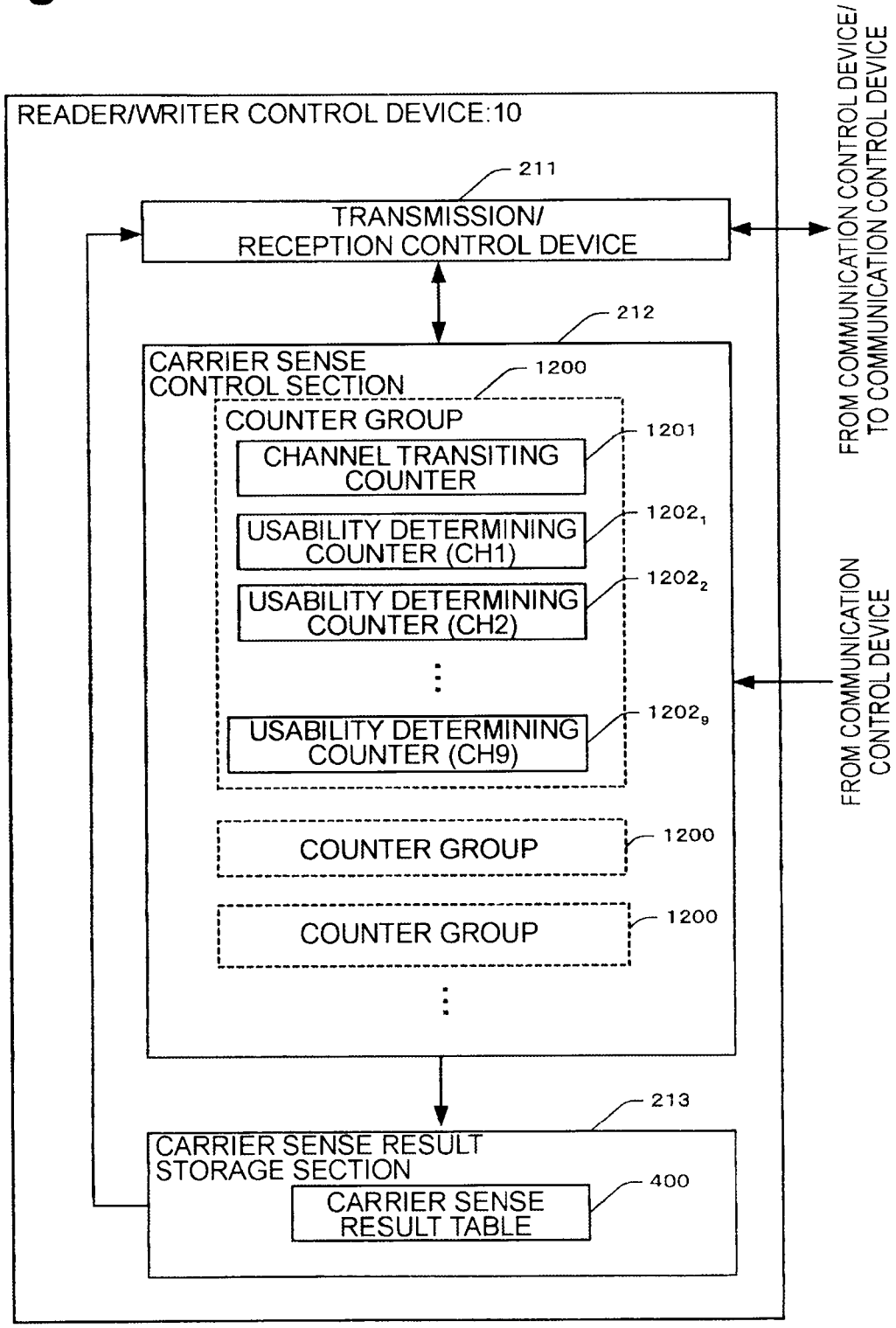
FIG. 12 is a block diagram illustrating an example of a configuration of the reader/writer control device.

FIG. 12 is a block diagram illustrating an example of a configuration of the reader/writer control device 10 of the present embodiment. As described in the embodiment, the reader/writer control device 10 includes a transmission/reception control section 211, a carrier sense control section 212, and a carrier sense result storage section 213. In the present embodiment, the carrier sense control section 212 includes one group of counters 1200 for each reader/writer 20, among the group of counters 1200, a channel transiting counter 1201, usability determining counters $1202_1$, $1202_2$, - - -, $1202_9$ (branch numbers are appended in order to distinguish the channels, when the usability determining counters are called without distinguishing them, they are denoted by reference numeral 1202) are included.

The channel transiting counter 1201 is a counter for sequentially switching unit radio channels to be a target of carrier sense determination. The usability determining counters 1202 are counters for determining usability of the corresponding channel, respectively.

As for a "counter" described here, it may be any object if it has a counting function, for example, it may be a variable number on a program, or a mechanical counter.

Figure 13:
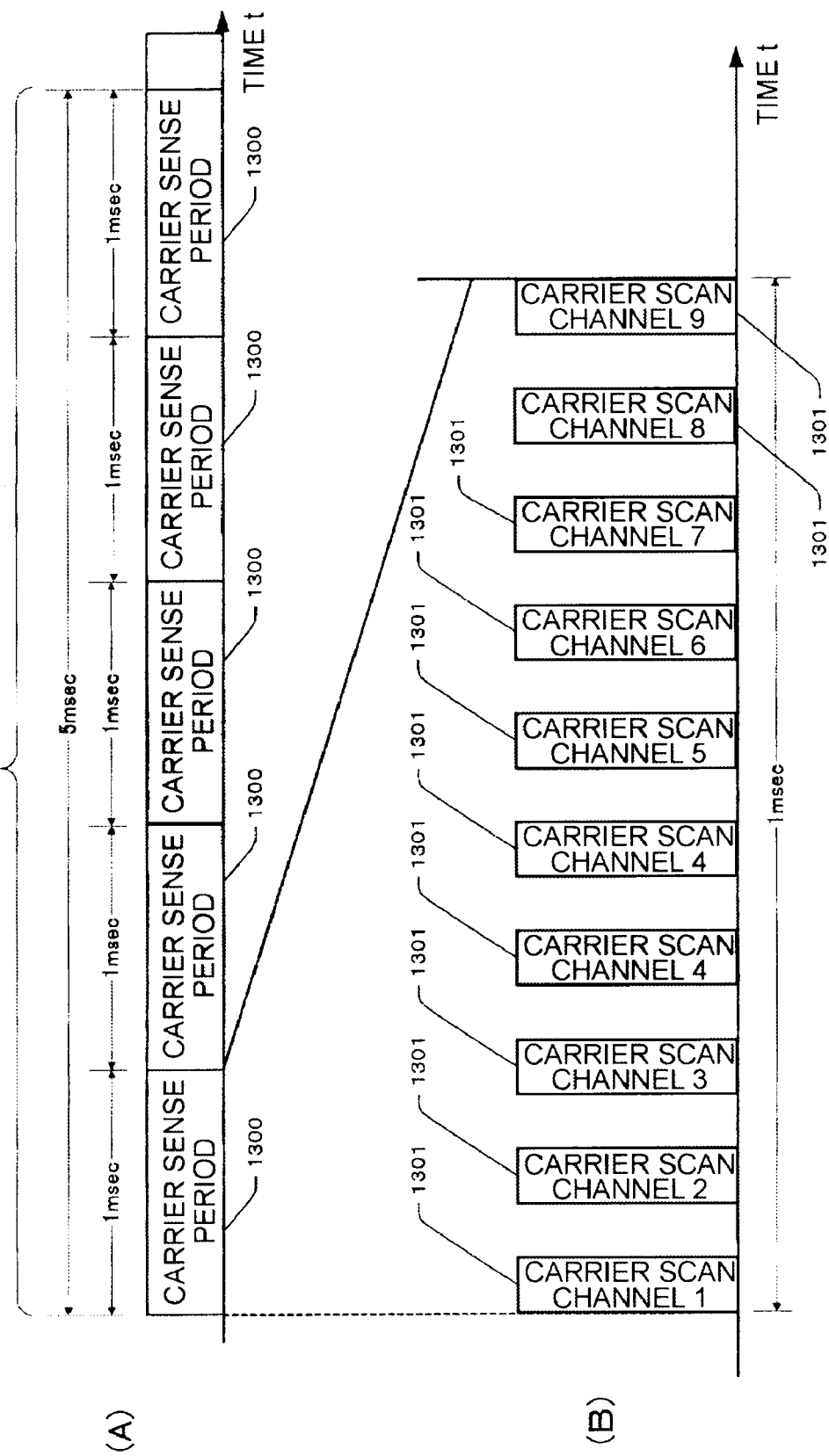
FIG. 13 illustrates (A) an example of a carrier sense period and (B) an execution mode executed in a carrier sense period.

FIG. 13 is a view illustrating an example of carrier sense executed by the reader/writer 20 in the present embodiment. FIG. 13(A) illustrates a way by which carrier sense periods 1300 are continued. As illustrated in the figure, upon completion of a certain carrier sense period, a new carrier sense period is started immediately.

In this example, the carrier sense period 1300 is 1 ms, and upon completion of five continuous carrier sense periods, carrier sense time of 5 ms that is defined in a standard is reached. That is when the carrier sense result in any one of the five continuous carrier sense periods 1500 is equal to or smaller than a carrier sense threshold value (for example, −74 dBm), the carrier sense control section 212 determines that the unit radio channel is usable. In another case, that is when the carrier sense result in any one of the five continuous carrier sense periods 1500 is more than a carrier sense threshold value (for example, −74 dBm), the carrier sense control section 212 determines that the unit radio channel is unusable (going to be used by others).

FIG. 13(B) illustrates an example of execution modes of carrier sense in each carrier sense period 1300. In each carrier sense period 1301, the reader/writer 20 executes carrier sense 1301 for nine unit radio channels 1 to 9, sequentially, and transmits results of carrier sense 1301 executed regarding each unit radio channel to the reader/writer control device 10 or outputs them, as RSSI.

The reader/writer 20 executes switching (transition, change) of unit radio channels in carrier sense 1301, automatically and autonomously without requiring direction of a unit radio channel to be used from the reader/writer control device 10. That is, the reader/writer 20 outputs RSSIs that are results of carrier sense 1301 for all unit radio channels to the reader/writer control device 10, continuously and continually. In addition, a configuration in which, in response to a request, a command or the like from the reader/writer control device 10, the reader/writer 20 executes starting/stopping/waiting/finishing of carrier sense, may be used, or a configuration in which, after being turned on, the reader/writer 20 always executes carrier sense 1301, continuously and continually, unless it is turned off, may also be used.

Figure 14:
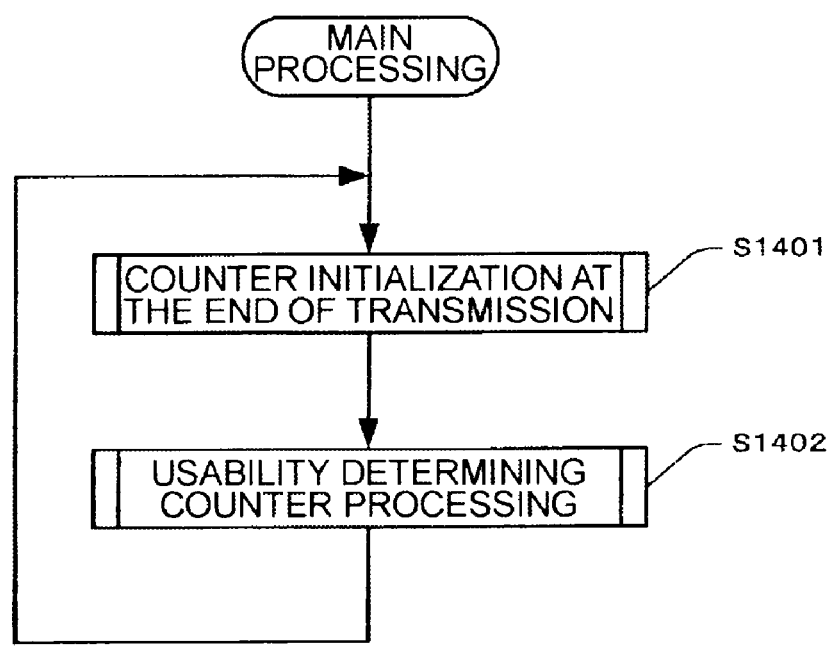
FIG. 14 is a view illustrating an example of main processing executed by a carrier sense control section.

FIG. 14 is a flow chart illustrating one example of main processing executed by the carrier sense control section 212 of the reader/writer control device 10 according to the present embodiment.

In the main processing, first, the carrier sense control section 212 executes counter initializing at the end of transmission (S1401).

The counter initializing at the end of transmission (S1401) is a procedure in which when the reader/writer 20 executes transmission/reception to/from the radio IC tag 40 using a certain unit radio channel, and then finishes the transmission/reception, the usability determining counter 1202 corresponding to the unit radio channel is reset, and a predetermined initial value (a first initial value) is set therein.

The first initial value used in the procedure is determined as follows. It is determined by the formula: N=M/L, where, N: first initial value; L: carrier sense period; and M: transmission/reception stop time. For example, for a 950 MHz band high output radio IC tag reading system, N=50, because the carrier sense period L is 1 ms, and the transmission/reception stop time M is 50 ms. Moreover, for a 950 MHz band low output radio IC tag reading system, N=100, because the carrier sense period L is 1 ms, and the transmission/reception stop time M is 100 ms.

Figure 15:
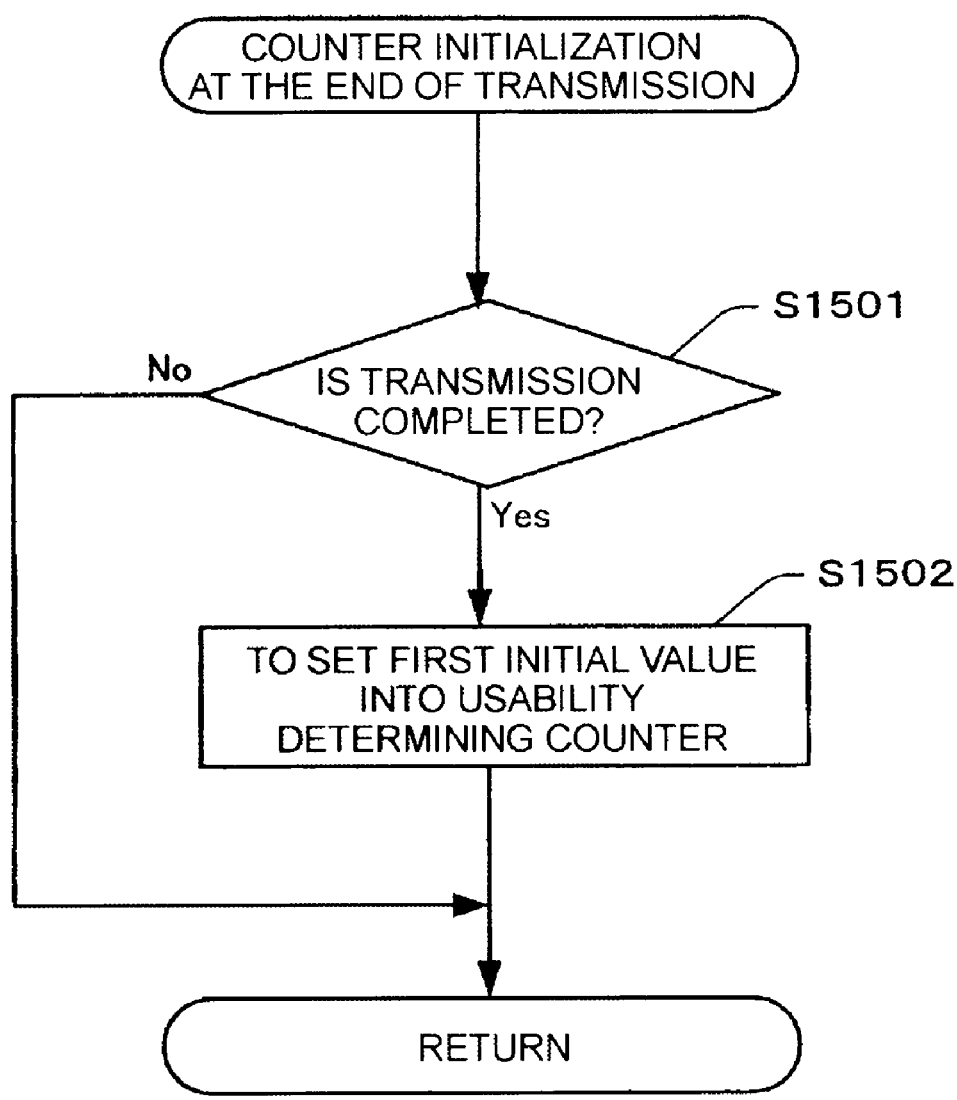
FIG. 15 is a view illustrating an example of counter initializing at the end of transmission executed by the carrier sense control section.

FIG. 15 is a flow chart illustrating an example of the counter initializing at the end of transmission (S1401). In the counter initializing at the end of transmission (S1401), first, the carrier sense control section determines whether transmission of the own system has finished in any one of unit radio channel (S1501). That is, in finishing transmission/reception to/from the radio IC tag, the transmission/reception control section 211 of the reader/writer control section 10, transmits a transmission finishing order to the reader/writer 20 and passes a transmission finishing message (it may be a command, a prescription, or the like) to the carrier sense control section 212.

In determination of the S1501, if the carrier sense control section 212 determines that transmission of the own system has not finished (S1501, No), that is, it has not received the transmission finishing message yet, it will completes the counter initializing at the end of transmission (S1401) directly, and return to control a main procedure.

On the other hand, if the carrier sense control section 212 determines that transmission of the own system has finished (S1501, Yes), that is, it has received the transmission finishing message, it will set a value of the usability determining counter 1202 corresponding to a unit radio channel that has finished transmission, as the above-mentioned first initial value N (S1502). After Step S1502, the carrier sense control section 212 will complete the counter initializing at the end of transmission, and return to control the main procedure.

Now, returning to FIG. 14, description of the main procedure will be continued. Upon completion of counter initializing at the end of transmission, the reader/writer control device 10, executes usability determining counter processing (S1402). The usability determining counter processing (S1402) is a procedure in which, depending on the result of carrier sense scan 1301 per unit radio channel, a value of the corresponding usability determining counter 1202 is changed. As described former, the usability determining counter 1202 has a function of storing a value in a changeable manner, for example, it is a predetermined storage region (a variable number) on a memory. The usability determining counters are provided so as to correspond to each unit channel. For example, in a radio IC tag reading system that uses nine unit radio channels 1 to 9, the reader/writer control device 10 is provided with nine usability determining counters $1202_1$ to $1202_9$ per one reader/writer 20.

Figure 16:
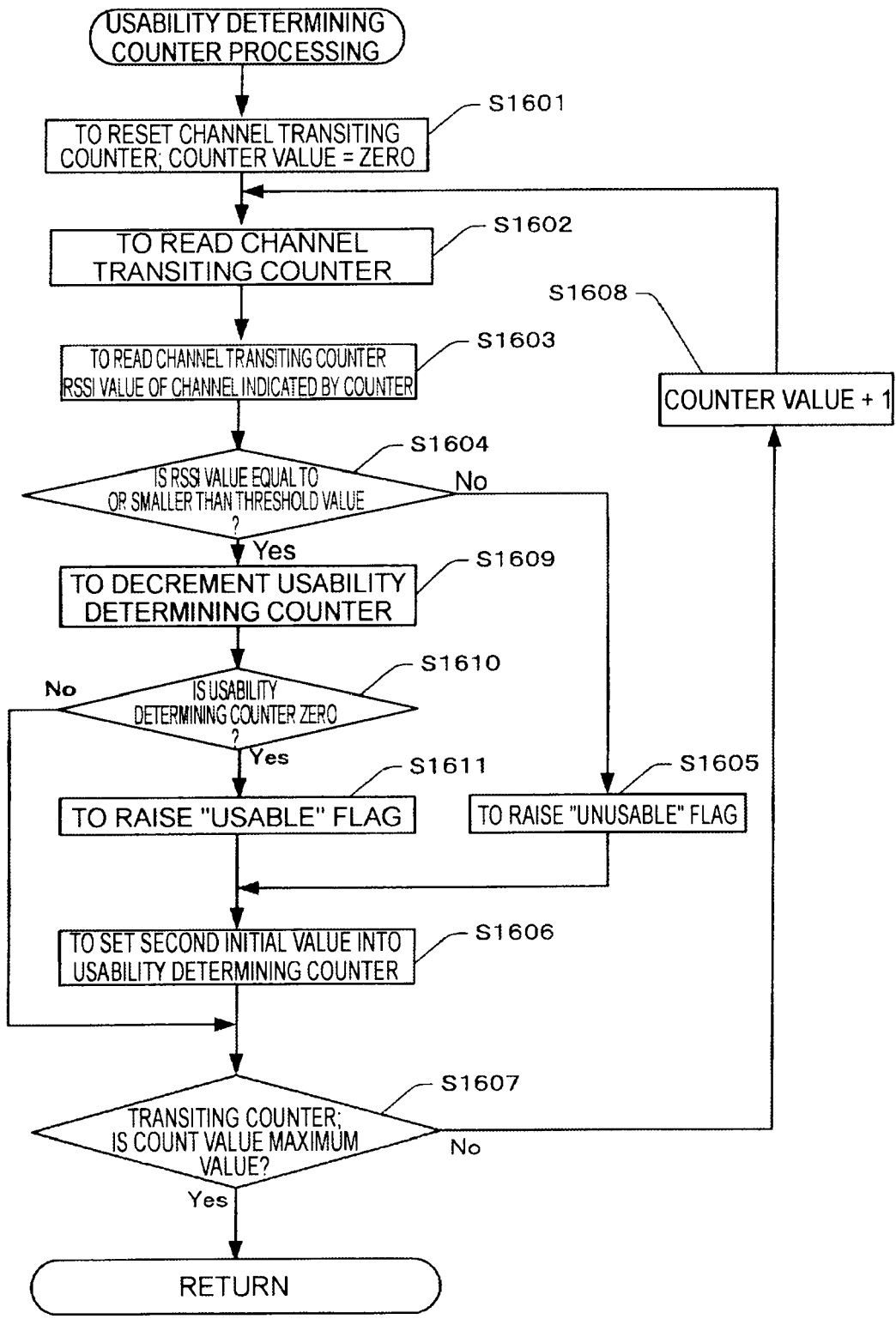
FIG. 16 is a view illustrating an example of usability determining counter processing executed by the carrier sense control section.

FIG. 16 is a flow chart illustrating an example of usability determining counter processing (S1402). Hereinafter, with reference to FIG. 16, a specific example of the usability determining counter processing will be described.

In starting of the usability determining counter processing, first, the carrier sense control section 212 resets the channel transiting counter 1201 and the counter value is set to "zero" (S1601). The channel transiting counter 1201 is a counter for changing a unit radio channel for determining carrier sense results sequentially.

Next, the carrier sense control section 212 read a value of the channel transiting counter 1201, and determines a unit radio channel for determining results of carrier sense result (S1602).

Next, the carrier sense control section 212 reads the latest RSSI corresponding to the unit radio channel determined at S1602 (S1603). In addition, the reader/writer 20 continually outputs RSSIs that are results of carrier sense for each of the unit radio channels, and transmits them to the reader/writer control device 10. Each RSSI is added with information (for example, channel number) indicating a unit radio channel so that which unit radio channel it corresponds to can be identified. The reader/writer control device 10 stores received RSSIs in advance so that it can distinguish that to which unit radio channel each RSSI corresponds, and in execution of Step S1603, it refers to a RSSI corresponding to the unit radio channel among the stored RSSIs.

Next, the carrier sense control section 212 determines whether the RSSI read at Step S1603 is equal to or smaller than a predetermined threshold value (for example, carrier sense level; −76 dBm) (S1604). When the RSSI is larger than the threshold value (S1604, No), the carrier sense control section 212 raises an "unusable" flag for the unit radio channel (S1605). That is, the carrier sense control section 212 writes the "unusable" flag on a corresponding record 401 and a corresponding flag storage field 402 of the carrier sense result table 400 stored by the carrier sense result storage section 213.

After execution of Step S1605, the carrier sense control section 212 sets a predetermined value (a second initial value) as a value of the corresponding usability determining counter 1202 (S1606). The second initial value is defined as follows. That is, it is expressed by the formula: O=Q/L, where, 0: the second initial value; L: the carrier sense period; and Q: the carrier sense time. For example, for a 950 MHz band high output radio IC tag reading system, O=5, because the carrier sense period L is 1 ms, and the carrier sense time Q is five ms.

Next, the carrier sense control section 212 determines whether a count value of the cannel transferring counter is the maximum value (S1607). Since a state of maximum counter value indicates that determination of RSSI is finished for every unit radio channels, the carrier sense control section 212 finishes usability determining counter processing, and returns to control the main processing (refer to FIG. 14).

On the other hand, in the determination of RSSI at Step S1604, if the carrier sense control section 212 determines that RSSI is equal to or smaller than the threshold value (S1604, Yes), it decrements (subtracts by one) a value of the usability determining counter 1202 corresponding to the unit radio channel indicated by the value of the channel transiting counter 1201 (S1609).

Following to Step S1609, the carrier sense control section 212 determines whether the value of usability determining counter 1202 is "zero" (S1610). That the value of the usability determining counter 1202 is "zero" indicates that during all continuous carrier scan periods 1301 of times (five, in this example) corresponding to the second initial value, the interference electric wave intensity of the unit radio channel has been equal to or smaller than the threshold value, that is, the unit radio channel is an empty channel, thereby it is usable.

In determination of S1610, if the carrier sense control section 212 determines that the value of the usability determining counter 1202 is "zero" (S1610, Yes), it raises a "usable" flag for the unit radio channel (S1611). That is, the carrier sense control section 212 writes data indicating the "usable" flag on the storage field 402 of the corresponding record 401 of the carrier sense result table 400 stored by the carrier sense result storage section 213.

After Step S1611, the carrier sense control section 212 sets the above-mentioned second initial value to the usability determining counter 1402 (S1606).

Next, the carrier sense control section 212 moves to above-mentioned count value determination of the channel transiting counter 1401 of Step S1607. In addition, since procedures after Step S1607 are the same as those mentioned above, description of them will be eliminated here.

On the other hand, if, at Step S1610, the carrier sense control section 212 determines that the value of the usability determining counter 1202 is not "zero" (S1610, No), it advances to Step S1607 immediately. In this case, since Steps S1611 and S1606 are not executed, the flag storage field 402 of the corresponding record 401 of the carrier sense result table 400 stored by the carrier sense result storage section 213, except that the value of the usability determining counter 1202 is decreased by one.

By the above-mentioned description, description of the usability determining counter processing will be finished.

Now, returning to FIG. 14, description of the main procedure will be continued. Upon completion of the usability determining counter processing (S1402), the carrier sense control section 212 returns to counter initializing at the end of transmission (S1401) again, and after that, executes the counter initializing at the end of transmission (S1401) and usability determining counter processing (S1402). By this main procedure, the carrier sense control section 212 controls the value of the usability determining counter 1202 so that a unusable flag can be raised for the unit radio channel until the transmission/reception time has past, and reflects the carrier sense results of unit radio channels during the carrier sense period on the value of the usability determining counter 1202.

By the above-mentioned description, description of the main processing will be finished.

Next, with regard to a trend of the value of the usability determining counter 1202 will be described.

FIGS. 17 to 20 are timing charts illustrating examples of the trend of the value of the usability determining counter 1202 corresponding to a certain unit radio channel.

When Usable Flag is Raised

Figure 17:
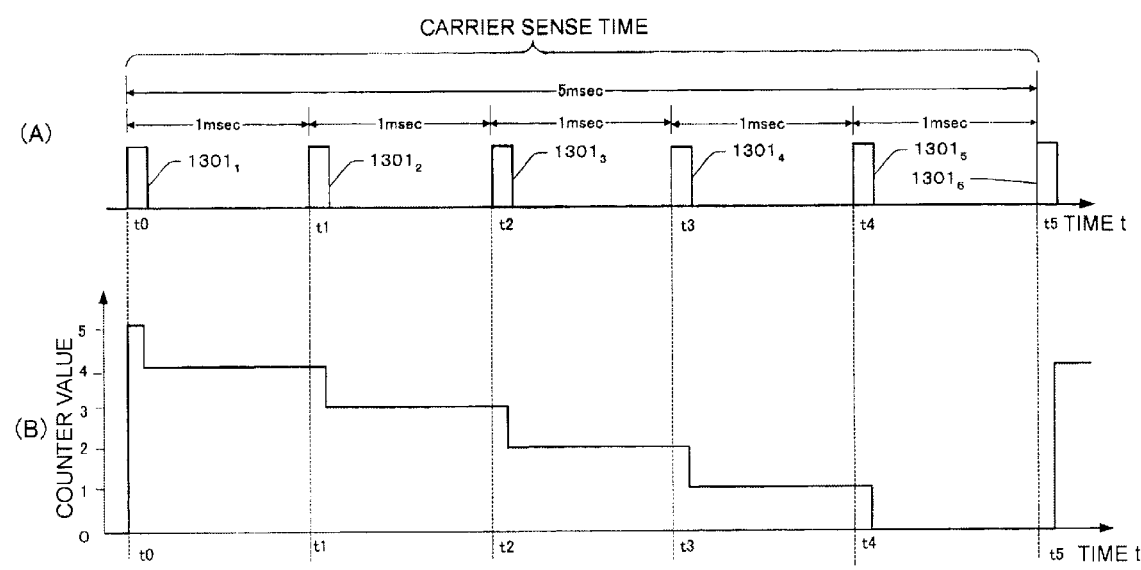
FIG. 17 illustrates (A) an example of carrier scan processing executed to a certain unit radio channel and (B) a trend of the value of the usability determining counter corresponding to (A)

FIG. 17 illustrates an example of a trend of the value of the usability determining counter 1202, when all the results of the carrier sense of the unit radio channel are equal to or smaller than a threshold value during five times of continuous carrier sense periods 1300, that is, the unit radio channel is an empty channel. FIG. 17 (A) is a timing chart illustrating execution of carrier sense 1301 of a certain unit radio channel. In this example, carrier senses $1301_1$ to $1301_6$ for the unit radio channel are executed during times t0 to t5 each has one ms interval. In addition, although the carrier sense 1301 for other unit radio channels is omitted in FIG. 17, in fact, the carrier senses 1301 for other unit radio channels are executed.

FIG. 17(B) is a chart illustrating a trend of the value of the usability determining counter 1202 corresponding to the unit radio channel illustrated in FIG. 17(A). It is supposed that, before time t0, the unit radio channel has been "zero".

At time t0 the value of the usability determining counter 1202 is set to the second initial value (refer to FIG. 16, S1606). Thus, the value of the usability determining counter 1202 will be the second initial value (=five) immediately after time t0 in FIG. 17(B).

Then, the carrier sense control section 212 receives the result of 1st carrier sense $1301_1$. In the example of illustrated in the figure, since the result of the carrier sense $1301_1$ is equal to or smaller than a threshold value, the carrier sense control section 212 decrements the value of the usability determining counter 1202 so that the value becomes to four (5−1=4) (refer to FIG. 16, S1609). The carrier sense control section 212 determines whether the value of the usability determining counter 1202 has become to "zero" (refer to FIG. 16, S1610), and as a result of determining that the value is not "zero", it does not set a second initial value as the value of the usability determining counter.

Next, 2nd carrier sense period 1300 is started at time t1, and the carrier sense $1301_2$ that is the 2nd time of the unit radio channel is executed. The carrier sense control section 212 receives the result of the 2nd carrier sense $1301_2$ from the reader/writer 20. In the example illustrated in the figure, since the result of the carrier sense $1301_2$ is equal to or smaller than a threshold value, the carrier sense control section 212 decrements the value of the usability determining counter 1202 so that the value becomes to three (=4−1).

Similarly, at time t2, t3 and t4, 3rd, 4th and 5th time carrier sense periods 1300 are started, respectively. During the 3rd, the 4th and the 5th time carrier sense periods 1300, the reader/writer 20 executes 3rd, 4th, and 5th time carrier senses $1301_3$, $1301_4$ and $1301_5$ for the unit radio channel, and outputs the results of these carrier senses $1301_3$, $1301_4$ and $1301_5$ to the reader/writer control device 10.

The carrier sense control section 212 of the reader/writer control device 10 receives the results of the 3rd, the 4th and the 5th time carrier senses $1301_3$, $1301_4$ and $1301_5$ from the reader/writer 20. In the example illustrated in the figure, since the results of the carrier senses $1301_3$, $1301_4$ and $1301_5$ at any time are also equal to or smaller than a threshold value, the carrier sense control section 212 decrements the value of the usability determining counter 1202. If 5th time decrementation according to the result of the 5th time carrier sense is executed after time t4, the value of the usability determining counter 1202 will be "zero". The carrier sense control section 212 determines whether the value of the usability determining counter 1202 has become to "zero", after the decrementation (refer to FIG. 16, S1610). In this case, since the value of the usability determining counter 1202 is "zero", as a result of determination, the carrier sense control section 212 operates so as to write a flag indicating "usable" in the carrier sense result table 400 (refer to FIG. 16, S1611).

When Unusable Flag is Raised

Figure 18:
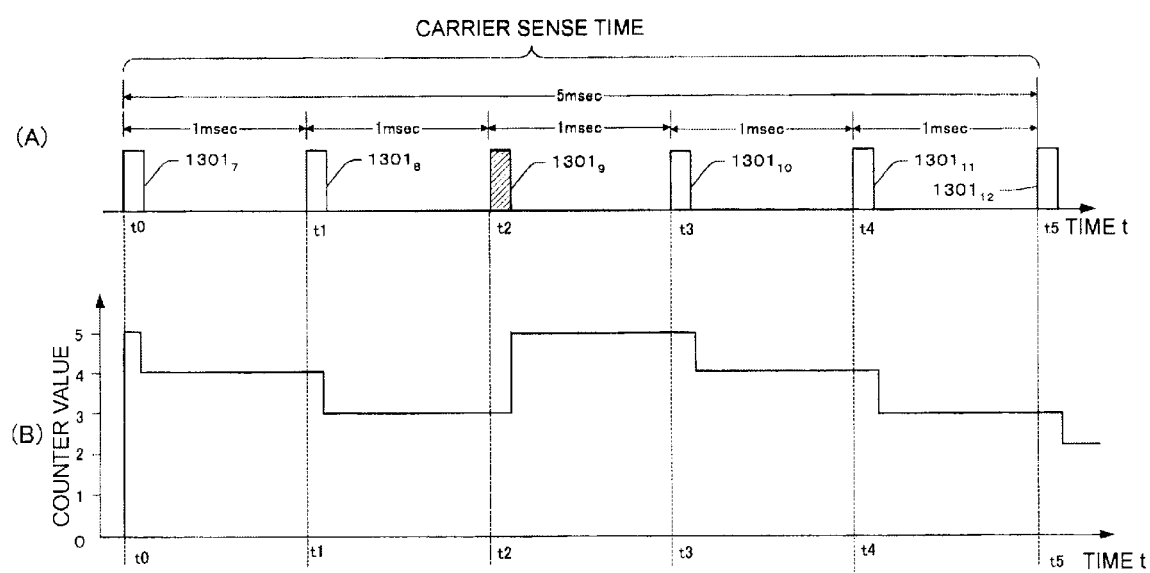
FIG. 18 illustrates (A) an example of carrier scan processing executed to a certain unit radio channel and (B) a trend of the value of the usability determining counter corresponding to (A)

Next, a trend of the value of the usability determining counter 1202 when an unusable flag is raised, will be described. FIG. 18 illustrates an example in which, as a result of carrier senses $1301_7$, $1301_8$, $1301_9$, $1301_{10}$ and $1301_{11}$ during five times of continuous carrier sense periods for a certain unit radio channel, the result of 3rd time carrier sense $1301_9$ is larger than the threshold value, and the results of the other carrier senses $1301_7$, $1301_8$, $1301_{10}$ and $1301_{11}$ are equal to or smaller than the threshold value.

Similar to FIG. 17(A), FIG. 18 (A) is a timing chart illustrating execution of the carrier sense 1301 for a certain unit radio channel. In the example, carrier senses $1301_7$ to $1301_{11}$ are executed for the unit radio channel during time t0 to time t4 each having an interval of one ms. In addition, although, in practice, carrier senses are executed for other unit radio channels, in FIG. 13, illustration of carrier sense execution for other unit radio channels are eliminated.

FIG. 18 (B) is a chart illustrating a trend of the value of the usability determining counter 1202 corresponding to the unit radio channel illustrated in FIG. 18 (A). It is supposed that before time t0, the value of the usability determining counter 1202 for the unit radio channel has been decremented to "zero" (refer to FIG. 16, S1609).

At time t0, the value of the usability determining counter 1202 is set to a second initial value (refer to FIG. 16, S1606). Thus, in FIG. 18 (B), the value of the usability determining counter 1202 will be the second initial value (=5). Then, the carrier sense control section 212 receives the result of 1st time carrier sense $1303_7$. In the example illustrated in the figure, since the result of the 1st carrier sense $1303_7$ is equal to or smaller than a threshold value, the carrier sense control section 212 decrements the value of the usability determining counter 1202 (refer to FIG. 16, S1609) so that the value of the usability determining counter 1202 becomes to four (=5−1). Subsequently, the carrier sense control section 212 determines whether the value of the usability determining counter 1202 has become to "zero" (refer to FIG. 16, S1610), and as a result of the determination, it determines that the value is not "zero".

Next, at time t1, 2nd time carrier sense period 1300 is started. During the period, 2nd time carrier sense $1301_8$ for the unit radio channel is executed. The carrier sense control section 212 receives the result of the 2nd time carrier sense $1301_8$ from the reader/writer 20. In the example illustrated in the figure, since the result of the carrier sense $1301_8$ is equal to or smaller than a threshold value, the carrier sense control section 212 decrements the value of the usability determining counter 1202 so that the value of the usability determining counter 1202 becomes to three (4−1=3).

Next, at time t2, 3rd time carrier sense period 1300 is started. During the period, 3rd time carrier sense $1301_9$ for the unit radio channel is executed. The carrier sense control section 212 receives the result of the 3rd time carrier sense $1301_9$ from the reader/writer 20. In the example illustrated in the figure, since the result of the carrier sense $1301_9$ is larger than the threshold value, the carrier sense control section 212 writes a unusable flag in the carrier sense result table 400 (refer to FIG. 16, S1605), and after that, it resets the value of the usability determining counter and sets the second initial value to the value (refer to FIG. 16, S1606).

Similarly, at time t3 and t4, 4th and 5th time carrier sense periods 1300 are started, respectively. During the 4th and the 5th time carrier sense periods 1300, the reader/writer 20 executes 4th and 5th time carrier senses $1301_{10}$ and $1301_{11}$ for the unit radio channel, and outputs the results of these carrier senses $1301_{10}$ and $1301_{11}$ to the reader/writer control device 10.

The carrier sense control section 212 of the reader/writer control device 10 receives the results of the 4th and the 5th time carrier senses $1301_{10}$ and $1301_{11}$ from the reader/writer 20. In the example illustrated in the figure, since the results of the carrier senses $1301_{10}$ and $1301_{11}$ at both times are also equal to or smaller than a threshold value, the carrier sense control section 212 decrements the value of the usability determining counter 1202. That is, according to the 4th time carrier sense $1301_{10}$, the value of the usability determining counter 1202 becomes to four (5−1=4), and according to the 5th time carrier sense $1301_{11}$, the value of the usability determining counter 1202 becomes to three (4−1=3). As a result, if decrementation according to the result of the 5th time carrier sense $1301_{11}$ is executed, the value of the usability determining counter 1202 will be "three".

The carrier sense control section 212 determines whether the value of the usability determining counter 1202 has become to "zero", after the decrementation (refer to FIG. 16, S1610). In this case, since the value of the usability determining counter 1202 is "three", as a result of determination, the carrier sense control section 212 operates so as to write a flag indicating "unusable" in the carrier sense result table 400 (refer to FIG. 16, S1615).

Since the carrier sense control section 212 operates in this manner, only a case when all the results of carrier senses 1310 executed during the five continuous carrier sense periods, that is the carrier sense time, are equal to or smaller than the threshold value, a flag indicating "usable" will be raised, and, in other cases, a flag indicating "unusable" will be raised.

When First Initial Value is Set to Usability Determining Counter

Figure 19:
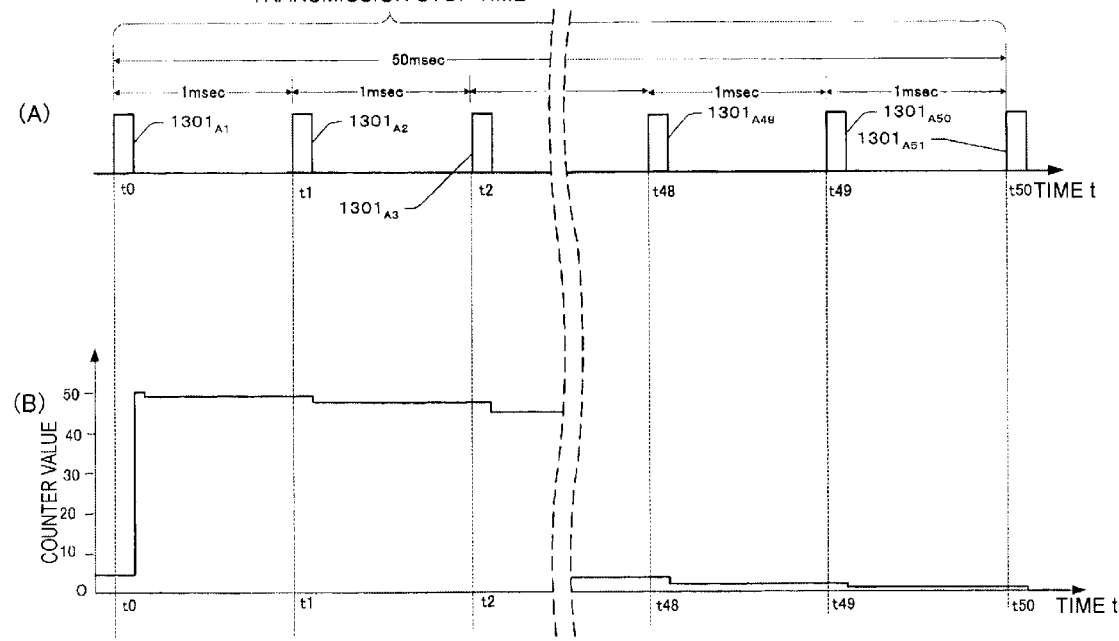
FIG. 19 illustrates (A) an example of carrier scan processing executed to a certain unit radio channel and (B) a trend of the value of the usability determining counter corresponding to (A)

Next, a trend of the value of the usability determining counter when the first initial value described in explanation of counter initialization at the end of transmission (FIG. 14, S1401) will be described. FIG. 19 is a view regarding to a unit radio channel of which transmission/reception is finished immediately before time t0, and FIG. 19 (A) illustrates an example in which, during 50 times of continuous carrier sense periods 1300, all the results of carrier senses 1301 for the unit radio channel are equal to or smaller than a threshold value.

FIG. 19 (A) is a timing chart illustrating execution of the carrier sense for a certain unit radio channel. In the example, carrier senses $1301_{A1}$ to $1301_{A50}$ for the unit radio channel are executed during time t0 to time t49 each having an interval of one ms. In addition, although, in practice, the carrier sense 1301 is executed for other unit radio channels, in FIG. 19 (A), illustration of carrier senses 1301 for other unit radio channels is omitted.

Now, it is supposed that, as a result of the carrier senses $1301_{A1}$ to $1301_{A50}$, results of all the carrier senses are equal to or smaller than a threshold value.

FIG. 19 (B) is a chart illustrating a trend of the value of the usability determining counter 1202 corresponding to the unit radio channel illustrated in FIG. 19 (A). Since the unit radio channel is going to be used for transmission/reception processing before time t0, it should be supposed that the value of the usability determining counter 1202 corresponding to the unit radio channel has become to the second initial value (=5).

At time t0, from the transmission/reception control section 211, the carrier sense control section 212 receives a signal, a command, or a message etc. indicating that the transmission/reception for the unit radio channel has completed. The carrier sense control section 212 executes the above-mentioned counter initialization at the end of transmission, and sets the value of the usability determining counter to the first initial value (50, in the example) (refer to FIG. 15, S1502).

Then, the carrier sense control section 212 receives the result of 1st time carrier sense 1301$A$1. In the example illustrated in the figure, since the result of the 1st carrier sense $1303_{A1}$ is equal to or smaller than a threshold value, the carrier sense control section 212 decrements the value of the usability determining counter 1202 (refer to FIG. 16, S1609) so that the value of the usability determining counter 1202 becomes to 49 (50−1=49). Subsequently, the carrier sense control section 212 determines whether the value of the usability determining counter 1202 has become to "zero" (refer to FIG. 16, S1610), and as a result of the determination, it determines that the value is not "zero".

Next, at time t1, 2nd time carrier sense period 1300 is started. During the period, 2nd time carrier sense $1301_{A2}$ for the unit radio channel is executed. The carrier sense control section 212 receives the result of the 2nd time carrier sense $1301_{A2}$ from the reader/writer 20. In the example illustrated in the figure, since the result of the carrier sense $1301_{A2}$ is equal to or smaller than a threshold value, the carrier sense control section 212 decrements the value of the usability determining counter 1202 so that the value of the usability determining counter 1202 becomes to 48 (49−1=48).

Similarly, at time t2, - - -, t3 and t4, 3rd to 50th time carrier sense periods 1300 are started, respectively. During the 3rd to 50th time carrier sense periods 1300, the reader/writer 20 executes 3rd to 50th time carrier senses $1301_{A3}$, to $1301_{A5}$ for the unit radio channel, and outputs the results of these carrier senses $1301_{A3}$ to $1301_{A50}$ to the reader/writer control device 10.

The carrier sense control section 212 of the reader/writer control device 10 receives the results of these carrier senses $1301_{A3}$ to $1301_{A50}$ from the reader/writer 20. In the example illustrated in the figure, since the results of the carrier senses at any time are also equal to or smaller than a threshold value, the carrier sense control section 212 decrements the value of the usability determining counter 1202, sequentially. That is, according to the 3rd time carrier sense $1301_{A3}$, the value of the usability determining counter 1202 becomes to 47 (48−1=47), and the other counter values are also decremented, similarly.

According to the 50th time carrier sense $1301_{A50}$, the value of the usability determining counter 1202 becomes to zero (1−1=0). As a result, if decrementation according to the result of the 50th time carrier sense $1301_{A50}$ is executed the value of the usability determining counter 1202 will be "zero".

The carrier sense control section 212 determines whether the value of the usability determining counter 1202 has become to "zero", after the decrementation according to the result of the 50th time carrier sense $1301_{A50}$ (refer to FIG. 16, S1610). In this case, since the value of the usability determining counter 1202 is "zero", as a result of determination, the carrier sense control section 212 operates so as to write a flag indicating "usable" in the carrier sense result table 400 (refer to FIG. 16, S1611).

Since the carrier sense control section 212 operates in this manner, only a case when all the results of carrier senses 1301 executed during the 50 times of continuous carrier sense periods, that is the carrier sense time, are equal to or smaller than the threshold value, a flag indicating "usable" will be raised, and, in other cases, a flag indicating "unusable" will be raised.

Next, a trend of the value of the usability determining counter will be described when the result of carrier sense scan is larger than a threshold value after the first initial value described in explanation of counter initialization at the end of transmission is set.

Figure 20:
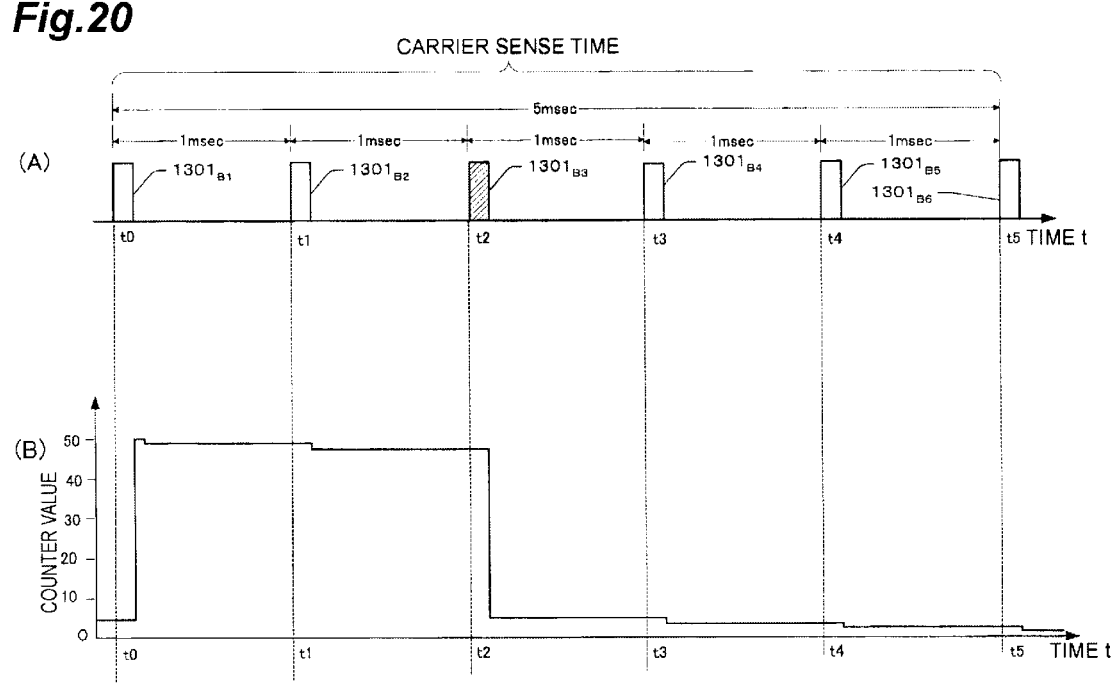
FIG. 20 illustrates (A) an example of carrier scan processing executed to a certain unit radio channel and (B) a trend of the value of the usability determining counter corresponding to (A).

FIG. 20 is a view regarding a unit radio channel of which transmission/reception is finished immediately before time t0, and FIG. 20 (A) illustrates an example in which, during five times of continuous carrier sense periods 1300, all the results of carrier senses 1301 for the unit radio channel has been larger than a threshold value once, and other results has been equal to or smaller than the threshold value.

Similar to FIG. 19 (A), FIG. 20 (A) is a timing chart illustrating execution of the carrier sense for a certain unit radio channel. In the example, carrier senses $1301_{B1}$ to $1301_{B5}$ for the unit radio channel are executed during time t0 to time t5 each having an interval of one ms. In addition, although, in practice, the carrier sense 1301 is executed for other unit radio channels, in FIG. 20 (A), illustration of carrier senses 1301 for other unit radio channels is omitted.

Now, it is supposed that, as a result of the carrier senses, result of carrier sense $1301_{B3}$ has been larger than a threshold value, and other results of carrier senses $1301_{B1}$, $1301_{B2}$, $1301_{B4}$ and $1301_{B5}$ has been equal to or smaller than the threshold value.

FIG. 20 (B) is a chart illustrating a trend of the value of the usability determining counter 1202 corresponding to the unit radio channel illustrated in FIG. 20 (A). Since the unit radio channel is going to be used for transmission/reception processing before time t0, it should be supposed that the value of the usability determining counter 1202 corresponding to the unit radio channel has become to the second initial value.

At time t0, from the transmission/reception control section 211, the carrier sense control section 212 receives a signal, a command, or a message etc. indicating that the transmission/reception for the unit radio channel has completed. The carrier sense control section 212 executes the above-mentioned counter initialization at the end of transmission (refer to FIG. 14, S1401), and sets the value of the usability determining counter to the first initial value (50, in the example) (refer to FIG. 15, S1502). Then, the carrier sense control section 212 receives the result of 1st time carrier sense $1301_{B1}$. In the example illustrated in the figure, since the result of the 1st carrier sense $1301_{B1}$ is equal to or smaller than a threshold value, the carrier sense control section 212 decrements the value of the usability determining counter 1202 (refer to FIG. 16, S1609) so that the value of the usability determining counter 1202 becomes to 49 (50−1=49). Subsequently, the carrier sense control section 212 determines whether the value of the usability determining counter 1202 has become to "zero" (refer to FIG. 16, S1610), and as a result of the determination, it determines that the value is not "zero".

Next, at time t1, 2nd time carrier sense period 1300 is started. During the period, 2nd time carrier sense $1301_{B2}$ for the unit radio channel is executed. The carrier sense control section 212 receives the result of the 2nd time carrier sense $1301_{B2}$ from the reader/writer 20. In the example illustrated in the figure, since the result of the carrier sense $1301_{B2}$ is equal to or smaller than a threshold value, the carrier sense control section 212 decrements the value of the usability determining counter 1202 so that the value of the usability determining counter 1202 becomes to 48 (49−1=48).

Next, at time t2, 3rd time carrier sense period 1300 is started. During the period, 3rd time carrier sense $1301_{B3}$ for the unit radio channel is executed. The carrier sense control section 212 receives the result of the 3rd time carrier sense $1301_{B3}$ from the reader/writer 20. In the example illustrated in the figure, since the result of the carrier sense $1301_{B3}$ is larger than the threshold value, the carrier sense control section 212 writes a unusable flag in the carrier sense result table 400, and it resets the value of the usability determining counter and sets the second initial value (5; in this example) to the value (refer to FIG. 16, S1606).

After that, at time t3 and t4, 4th and 5th time carrier sense periods 1300 are started, respectively. During the 4th and the 5th time carrier sense periods 1300, the reader/writer 20 executes 4th and 5th time carrier senses $1301_{B4}$ and $1301_{B5}$ for the unit radio channel, and outputs the results of these carrier senses $1301_{B4}$ and $1301_{B5}$ to the reader/writer control device 10.

The carrier sense control section 212 of the reader/writer control device 10 receives the results of the 4th and the 5th time carrier senses $1301_{B4}$ and $1301_{B5}$ from the reader/writer 20. In the example illustrated in the figure, since the results of the carrier senses $1301_{B4}$ and $1301_{B5}$ at both times are also equal to or smaller than a threshold value, the carrier sense control section 212 decrements the value of the usability determining counter 1202. That is, according to the 4th time carrier sense $1301_{B4}$, the value of the usability determining counter 1202 becomes to four (5−1=4), and according to the 5th time carrier sense $1301_{B5}$, the value of the counter 1202 becomes to three (4−1=3). As a result, if decrementation according to the result of the 5th time carrier sense $1301_{B5}$ is executed the value of the usability determining counter 1202 will be "three".

After the decrementation, the carrier sense control section 212 determines whether the value of the usability determining counter 1202 has become to "zero" (refer to FIG. 16, S1610). In this case, since the values of the usability determining counter 1202 are "four" and "three", as a result of determination of the value, the carrier sense control section 212 does not write a flag indicating "usable" in the carrier sense result table 400 (refer to FIG. 16, S10). However, if the result of the subsequent carrier scan is equal to or smaller than the threshold value, since the value of the usability determining counter 1202 will be "zero" even before passage of the transmission stop time (before passage of 50 times of carrier scan periods from time t0), a flag indicating "usable" will be raised for the unit radio channel.

Since the carrier sense control section 212 operates in this manner, in a case etc. when, upon completion of transmission, another reader/writer 20 use the unit radio channel once even if the transmission stop time has not past, a flag indicating that the unit radio channel is "usable" is raised, thereby, enabling to execute transmission/reception of its own system immediately using the unit radio channel.

In addition, although, in the present embodiment, separate type reader/writer 20 that has a transmission section and a reception section separately has been described, a common type reader/writer 20 in which they are integrated may also be used. Since it is possible for the reader/writer 20 to be placed in a small space, a system according to the present invention can be placed effectively even in a small space.

INDUSTRIAL APPLICABILITY

According to the present invention, it is possible to avoid time loss due to an execution time of carrier sense or transmission stop tine so as to read more radio IC tags than ever in a limited time.

The invention claimed is:

1. A radio integrated circuit (IC) tag reading device that can use a plurality of unit radio channels and reads a radio IC tag, comprising: a first oscillation means for generating a signal having a frequency meeting a unit radio channel to be used for transmission/reception to/from the radio IC tag; a transmission/reception means for executing transmission/reception to/from the radio IC tag, using a signal generated by the first oscillation means; a second oscillation means for generating a signal having a variable frequency meeting a unit radio channel that measures strength of a received electric wave; a carrier sense means for measuring strength of a received electric wave regarding each unit radio channel using the signal generated by the second oscillation means; and a control means for controlling the first oscillation means so as to generate a carrier wave signal having a frequency meeting a unit radio channel to be used by the transmission/reception means, the unit radio channel being selected based on a measured result by the carrier sense means, upon passage of a continuous transmittable time that is a time during which the unit radio channel to be used for transmission/reception to/from the radio IC tag can be used continuously, after start of the transmission/reception by the transmission/reception means.

2. The radio IC tag reading device according to claim 1, wherein the control means, upon passage of the continuous transmittable time, causes the transmission/reception means to execute transmission/reception using another unit radio channel without providing a transmission stop time.

3. The radio IC tag reading device according to claim 1, wherein the control means causes the second oscillation means to change a frequency of a generating signal so that the carrier sense means executes carrier sense for each of the plurality unit radio channels.

4. The radio IC tag reading device according to claim 2, wherein the control means causes the second oscillation means to change a frequency of a generating signal so that the carrier sense means executes carrier sense for each of the plurality unit radio channels.

5. A control device for controlling a radio integrated circuit (IC) tag reading device that can use a plurality of unit radio channels and reads a radio IC tag, comprising: a transmission/reception control means for directing the radio IC tag reading device to use a unit radio channel to be used for transmission/reception to/from the radio IC tag; and a carrier sense control means for receiving information indicating intensity of a received electric wave regarding each unit radio channel being measured by the radio IC tag reading device, and for storing information indicating usability of each unit radio channel, based on the information, wherein upon passage of a continuous transmittable time that is a time during which the same unit radio channel can be used continuously, after start of transmission/reception by the radio IC tag reading device, the transmission/reception control means, based on the information indicating usability of each unit radio channel, directs the radio IC tag reading device to use a unit radio channel other than the unit radio channel that has been used for the transmission/reception by the radio IC tag reading device.

6. The control device according to claim 5, wherein upon passage of the continuous transmittable time, the transmission/reception control means causes the radio IC tag reading device to execute transmission/reception using another unit radio channel without providing a transmission stop time.

7. The control device according to claim 5, wherein the carrier sense control means directs the radio IC tag reading device to change a unit radio channel for executing carrier sense so that the radio IC tag reading device executes carrier sense for each of the plurality of unit radio channels.

8. The control device according to claim 6, wherein the carrier sense control means directs the radio IC tag reading device to change a unit radio channel for executing carrier sense so that the radio IC tag reading device executes carrier sense for each of the plurality of unit radio channels.

9. A radio integrated circuit (IC) tag reading system that can use a plurality of unit radio channels and reads a radio IC tag, comprising: a radio IC tag reading device for executing transmission/reception to/from a radio IC tag using any one of the plurality of unit radio channels and measuring strength of a received electric wave regarding each unit radio channel to output information indicating measured results; and a control device for directing the radio IC tag reading device to use a unit radio channel to be used for transmission/reception to/from the radio IC tag, receiving information indicating the strength of received electric wave that is measured by the radio IC tag reading device regarding each unit radio channel, storing information indicating usability of each of the unit radio channels based on the information indicating the strength of received electric wave, and directing, upon passage of a continuous transmittable time that is a time during which the same unit radio channel can be used continuously, after start of transmission/reception by the radio IC tag reading device, based on the information indicating usability of each of the unit radio channels, the radio IC tag reading device to use a unit radio channel other than the unit radio channel that has been used for the transmission/reception by the radio IC tag reading device.

10. The radio IC tag reading system according to claim 9, wherein upon passage of the continuous transmittable time, the control device causes the radio IC tag reading device to execute transmission/reception using another unit radio channel without providing a transmission stop time.

11. The radio IC tag reading system according to claim 9, wherein the control device directs the radio IC tag reading device to change the unit radio channel for executing carrier sense so that the radio IC tag reading device executes carrier sense for each of the plurality of unit radio channels.

12. The radio IC tag reading system according to claim 10, wherein the control device directs the radio IC tag reading device to change the unit radio channel to execute carrier sense so that the radio IC tag reading device executes carrier sense for each of the plurality of unit radio channels.

* * * * *